(12) United States Patent
Kumawat et al.

(10) Patent No.: US 12,239,977 B2
(45) Date of Patent: Mar. 4, 2025

(54) POROUS SUBSTRATE-BASED MICROFLUIDIC DEVICES

(71) Applicant: New York University in Abu Dhabi Corporation, Abu Dhabi (AE)

(72) Inventors: Nityanand Kumawat, Abu Dhabi (AE); Soja Saghar Soman, Abu Dhabi (AE); Vijayavenkataraman Sanjairaj, Abu Dhabi (AE); Sunil Kumar, Abu Dhabi (AE)

(73) Assignee: New York University in Abu Dhabi Corporation, Abu Dhabi (AE)

( * ) Notice: Subject to any disclaimer, the term of this patent is extended or adjusted under 35 U.S.C. 154(b) by 0 days.

(21) Appl. No.: 18/052,015

(22) Filed: Nov. 2, 2022

(65) Prior Publication Data
US 2023/0285960 A1    Sep. 14, 2023

Related U.S. Application Data

(60) Provisional application No. 63/274,697, filed on Nov. 2, 2021.

(51) Int. Cl.
*B01L 3/00* (2006.01)
*B32B 27/30* (2006.01)
(Continued)

(52) U.S. Cl.
CPC ...... *B01L 3/502707* (2013.01); *B32B 27/306* (2013.01); *B32B 27/36* (2013.01);
(Continued)

(58) Field of Classification Search
CPC ....... B32B 27/306; B32B 27/36; B32B 37/06; B32B 37/12; B32B 37/182;
(Continued)

(56) References Cited

U.S. PATENT DOCUMENTS 5,376,252 A    12/1994  Ekstroem
6,240,790 B1   6/2001   Swedberg
(Continued)

OTHER PUBLICATIONS

Martinez, A.W., S.T. Phillips, and G.M. Whitesides, Three-dimensional microfluidic devices fabricated in layered paper and tape. Proceedings of the National Academy of Sciences, 2008. 105(50): p. 19606.
(Continued)

*Primary Examiner* — John L Goff, II
(74) *Attorney, Agent, or Firm* — Riverside Law LLP

(57) ABSTRACT

A method of manufacturing a microfluidic analytical device comprising providing a top lamination layer and a bottom lamination layer, wherein each of the top lamination layer and bottom lamination layer comprises an outer layer and an inner layer, cutting out one or more channel spaces from the at least one of the top lamination layer and the bottom lamination layer, wherein the one or more channel spaces form a microfluidic path, positioning at least one middle layer between the top lamination layer and the bottom lamination layer, such that each of the two inner layers face the at least one middle layer, and subjecting the top lamination layer and the bottom lamination layer to a process, wherein the process allows both the inner layers to permeate substantially through the at least one middle layer.

14 Claims, 17 Drawing Sheets

(51) Int. Cl.
   *B32B 27/36* (2006.01)
   *B32B 37/06* (2006.01)
   *B32B 37/12* (2006.01)
   *B32B 37/18* (2006.01)

(52) U.S. Cl.
   CPC ............. *B32B 37/06* (2013.01); *B32B 37/12* (2013.01); *B32B 37/182* (2013.01); *B32B 2250/05* (2013.01); *B32B 2250/40* (2013.01); *B32B 2307/728* (2013.01); *B32B 2309/025* (2013.01)

(58) Field of Classification Search
   CPC ... B32B 37/0076; B32B 37/04; B32B 37/185; B32B 2250/05; B32B 2250/40; B32B 2307/728; B32B 2309/025; B32B 38/10; B32B 38/08; B01L 13/502707; B01L 2300/0887; B01L 2300/126; B01L 3/502707
   USPC ................................................ 156/290, 292
   See application file for complete search history.

(56) References Cited

U.S. PATENT DOCUMENTS

| | | | |
|---|---|---|---|
| 6,264,892 B1 | 7/2001 | Kaltenbach | |
| 2002/0185184 A1* | 12/2002 | O'Connor | B01F 33/30 137/822 |
| 2003/0150792 A1* | 8/2003 | Koehler | B01L 3/502753 422/534 |
| 2003/0150806 A1 | 8/2003 | Hobbs | |
| 2010/0266455 A1* | 10/2010 | Sommer | B01L 3/06 422/504 |

OTHER PUBLICATIONS

Minic, R., et al., Optimization, Validation and Standardization of ELISA. IntechOpen. 2021.

Musile, G., et al., The development of paper microfluidic devices for presumptive drug detection. Analytical Methods, 2015. 7(19): p. 8025-8033.

N. Kumawat, S. S. Soman, S. Vijayavenkataraman and S. Kumar, Lab Chip, 2022, 22, 3377-3389 RSC.

Nadar, S.S., et al., Enzyme embedded microfluidic paper-based analytic device (μPAD): a comprehensive review. Critical Reviews in Biotechnology, 2021. 41(7): p. 1046-1080.

Ng, J.S. and M. Hashimoto, Fabrication of paper microfluidic devices using a toner laser printer. RSC Advances, 2020. 10(50): p. 29797-29807.

Noviana, E., et al., Microfluidic Paper-Based Analytical Devices: From Design to Applications. Chemical Reviews, 2021. 121(19): p. 11835-11885.

Olkkonen, J., K. Lehtinen, and T. Erho, Flexographically Printed Fluidic Structures in Paper. Analytical Chemistry, 2010. 82(24): p. 10246-10250.

Oncescu, V., D. O'Dell, and D. Erickson, Smartphone based health accessory for colorimetric detection of biomarkers in sweat and saliva. Lab on a Chip, 2013. 13(16): p. 3232-3238.

Ong DSY, et al., How to interpret and use COVID-19 serology and immunology tests. Clin Microbiol Infect. 2021;27(7):981-986.

Park, Y.-J., et al., Adhesion and rheological properties of EVA-based hot-melt adhesives. International Journal of Adhesion and Adhesives, 2006. 26(8): p. 571-576.

Piety, N.Z., et al., A Paper-Based Test for Screening Newborns for Sickle Cell Disease. Scientific Reports, 2017. 7(1): p. 45488.

Rutkowska, M., et al., Low-cost flexible laminated graphene paper solid-contact ion-selective electrodes. Sensors and Actuators B: Chemical, 2021. 337: p. 129808.

Sicard, C., et al., Tools for water quality monitoring and mapping using paper-based sensors and cell phones. Water Research, 2015. 70: p. 360-369.

Soman, S.S., D.S. Arathy, and E. Sreekumar, Discovery of Anas platyrhynchos avian β-defensin 2 (Apl_AvBD2) with antibacterial and chemotactic functions. Molecular Immunology, 2009. 46(10): p. 2029-2038.

Tao, F.F., et al., Paper-based cell culture microfluidic system. BioChip Journal, 2015. 9(2): p. 97-104.

Vernet R., et al., A Quantitative ELISA Protocol for Detection of Specific Human IgG against the SARS-CoV-2 Spike Protein. Vaccines (Basel). 2021;9(7):770.

Wang, C.-M., C.-Y. Chen, and W.-S. Liao, Enclosed paper-based analytical devices: Concept, variety, and outlook. Analytica Chimica Acta, 2021. 1144: p. 158-174.

Wang, P., et al., Development of a paper-based, inexpensive, and disposable electrochemical sensing platform for nitrite detection. Electrochemistry Communications, 2017. 81: p. 74-78.

Wang, W., et al., Tree-shaped paper strip for semiquantitative colorimetric detection of protein with self-calibration. Journal of Chromatography A, 2010. 1217(24): p. 3896-3899.

Welch NG., et al., Polypropylene microtitre plates modified with [Cr(OH)6]3-for enhanced ELISA sensitivity. J Immunol Methods. 2017. ;446:70-73.

Yamada, K., et al., Paper-Based Inkjet-Printed Microfluidic Analytical Devices. Angewandte Chemie International Edition, 2015. 54(18): p. 5294-5310.

Yang, Y., et al., Paper-Based Microfluidic Devices: Emerging Themes and Applications. Analytical Chemistry, 2017. 89 (1): p. 71-91.

Yetisen, A.K., M.S. Akram, and C.R. Lowe, Paper-based microfluidic point-of-care diagnostic devices. Lab on a Chip, 2013. 13(12): p. 2210-2251.

Zhang S., et al., Predicting detection limits of enzyme-linked immunosorbent assay (ELISA) and bioanalytical techniques in general. Analyst. Jan. 21, 2014;139(2):439-45.

Zhang, Y., P. Zuo, and B.-C. Ye, A low-cost and simple paper-based microfluidic device for simultaneous multiplex determination of different types of chemical contaminants in food. Biosensors and Bioelectronics, 2015. 68: p. 14-19.

Abe, K., et al., Inkjet-printed paperfluidic immuno-chemical sensing device. Analytical and Bioanalytical Chemistry, 2010. 398(2): p. 885-893.

Abe, K., K. Suzuki, and D. Citterio, Inkjet-Printed Microfluidic Multianalyte Chemical Sensing Paper. Analytical Chemistry, 2008. 80(18): p. 6928-6934.

Akyazi, T., L. Basabe-Desmonts, and F. Benito-Lopez, Review on microfluidic paper-based analytical devices towards commercialisation. Analytica Chimica Acta, 2018. 1001: p. 1-17.

Anni, M., Operational lifetime improvement of poly(9,9-dioctylfluorene) active waveguides by thermal lamination. Applied Physics Letters, 2012. 101(1): p. 013303.

Apilux, A., et al., Development of automated paper-based devices for sequential multistep sandwich enzyme-linked immunosorbent assays using inkjet printing. Lab on a Chip, 2013. 13(1): p. 126-135.

Atkin, L., Chronic wounds: the challenges of appropriate management. British Journal of Community Nursing, 2019. 24 (Sup9): p. S26-S32.

Boudet F., et al., UV-treated polystyrene microtitre plates for use in an ELISA to measure antibodies against synthetic peptides. J Immunol Methods. Aug. 28, 1991;142(1):73-82.

Bruzewicz, D.A., M. Reches, and G.M. Whitesides, Low-Cost Printing of Poly(dimethylsiloxane) Barriers To Define Microchannels in Paper. Analytical Chemistry, 2008. 80(9): p. 3387-3392.

Camplisson, C.K., et al., Two-ply channels for faster wicking in paper-based microfluidic devices. Lab on a Chip, 2015. 15(23): p. 4461-4466.

Carrilho, E., A.W. Martinez, and G.M. Whitesides, Understanding Wax Printing: A Simple Micropatterning Process for Paper-Based Microfluidics. Analytical Chemistry, 2009. 81(16): p. 7091-7095.

Cassano, C.L. and Z.H. Fan, Laminated paper-based analytical devices (LPAD): fabrication, characterization, and assays. Microfluidics and Nanofluidics, 2013. 15(2): p. 173-181.

(56) References Cited

OTHER PUBLICATIONS

Cate, D.M., et al., Recent Developments in Paper-Based Microfluidic Devices. Analytical Chemistry, 2015. 87(1): p. 19-41.
Chaiyo, S., et al., Highly selective and sensitive paper-based colorimetric sensor using thiosulfate catalytic etching of silver nanoplates for trace determination of copper ions. Analytica Chimica Acta, 2015. 866: p. 75-83.
Chen, Y., et al., Point-of-care and visual detection of P. aeruginosa and its toxin genes by multiple LAMP and lateral flow nucleic acid biosensor. Biosensors & bioelectronics, 2016. 81: p. 317-323.
Chitnis, G., et al., Laser-treated hydrophobic paper: an inexpensive microfluidic platform. Lab on a Chip, 2011. 11(6): p. 1161-1165.
Choi, J.R., et al., An integrated paper-based sample-to-answer biosensor for nucleic acid testing at the point of care. Lab on a Chip, 2016. 16(3): p. 611-621.
Choi, J.R., et al., Emerging Point-of-care Technologies for Food Safety Analysis. Sensors (Basel, Switzerland), 2019. 19(4): p. 817.
Crawford, R.J. and J.L. Throne, 2—Rotational Molding Polymers, in Rotational Molding Technology, R.J. Crawford and J.L. Throne, Editors. 2002, William Andrew Publishing: Norwich, NY. p. 19-68.
De Tarso Garcia, P., et al., A handheld stamping process to fabricate microfluidic paper-based analytical devices with chemically modified surface for clinical assays. RSC Advances, 2014. 4(71): p. 37637-37644.
Dungchai, W., O. Chailapakul, and C.S. Henry, A low-cost, simple, and rapid fabrication method for paper-based microfluidics using wax screen-printing. Analyst, 2011. 136(1): p. 77-82.
Fenton, E.M., et al., Multiplex Lateral-Flow Test Strips Fabricated by Two-Dimensional Shaping. ACS Applied Materials & Interfaces, 2009. 1(1): p. 124-129.
Ghaderinezhad, F., et al., High-throughput rapid-prototyping of low-cost paper-based microfluidics. Scientific Reports, 2017. 7(1): p. 3553.
Ghosh, R., et al., Fabrication of laser printed microfluidic paper-based analytical devices (LP-µPADs) for point-of-care applications. Scientific Reports, 2019. 9(1): p. 7896.
Gong, M.M. and D. Sinton, Turning the Page: Advancing Paper-Based Microfluidics for Broad Diagnostic Application. Chemical Reviews, 2017. 117(12): p. 8447-8480.
Hao, Z., et al., Fabrication for paper-based microfluidic analytical devices and saliva analysis application. Microfluidics and Nanofluidics, 2021. 25(10): p. 80.
Hede, M.S., et al., Detection of the Malaria causing Plasmodium Parasite in Saliva from Infected Patients using Topoisomerase I Activity as a Biomarker. Scientific Reports, 2018. 8(1): p. 4122.
Hofstetter, J.C., et al., Quantitative colorimetric paper analytical devices based on radial distance measurements for aqueous metal determination. Analyst, 2018. 143(13): p. 3085-3090.
Hong, B., et al., A concentration gradient generator on a paper-based microfluidic chip coupled with cell culture microarray for high-throughput drug screening. Biomedical Microdevices, 2016. 18(1): p. 21.
Kasetsirikul S., et al., Detection of the SARS-CoV-2 humanized antibody with paper-based ELISA. Analyst. 2020;145(23):7680-7686.
Kasetsirikul, S., et al., Rapid, Simple and Inexpensive Fabrication of Paper-Based Analytical Devices by Parafilm Hot Pressing. Micromachines, 2022. 13(1).
Ketelsen A., et al., Sensitive detection of hydrophobic antigens using a novel lipid-aggregate based ELISA. J Immunol Methods. Dec. 31, 2008;339(2):195-204.
Khan, M.S., S.A. Shadman, and M.M.R. Khandaker, Advances and current trend of bioactive papers and paper diagnostics for health and biotechnological applications. Current Opinion in Chemical Engineering, 2022. 35: p. 100733.
Kim, Y.S., Y. Yang, and C.S. Henry, Laminated and infused Parafilm®—paper for paper-based analytical devices. Sensors and Actuators B: Chemical, 2018. 255: p. 3654-3661.
Klasner, S.A., et al., Paper-based microfluidic devices for analysis of clinically relevant analytes present in urine and saliva. Analytical and Bioanalytical Chemistry, 2010. 397(5): p. 1821-1829.
Kudo, H., et al., Microfluidic Paper-Based Analytical Devices for Colorimetric Detection of Lactoferrin. SLAS Technology: Translating Life Sciences Innovation, 2019. 25(1): p. 47-57.
Kumar, A.A., et al., From the Bench to the Field in Low-Cost Diagnostics: Two Case Studies. Angewandte Chemie International Edition, 2015. 54(20): p. 5836-5853.
Lam, T., et al., A Chemically Patterned Microfluidic Paper-based Analytical Device (C-µPAD) for Point-of-Care Diagnostics. Scientific Reports, 2017. 7(1): p. 1188.
Ledford H. The next variant: three key questions about what's after Omicron. Nature. 2022;603(7900):212-213.
Li, B., et al., Quantum Dot-Based Molecularly Imprinted Polymers on Three-Dimensional Origami Paper Microfluidic Chip for Fluorescence Detection of Phycocyanin. ACS Sensors, 2017. 2(2): p. 243-250.
Li, X., D.R. Ballerini, and W. Shen, A perspective on paper-based microfluidics: Current status and future trends. Biomicrofluidics, 2012. 6(1): p. 011301.
Li, X., et al., Paper-Based Microfluidic Devices by Plasma Treatment. Analytical Chemistry, 2008. 80(23): p. 9131-9134.
Liu, C.-C., et al., Microfluidic paper-based chip platform for benzoic acid detection in food. Food Chemistry, 2018. 249: p. 162-167.
Liu, S., et al., Directly writing barrier-free patterned biosensors and bioassays on paper for low-cost diagnostics. Sensors and Actuators B: Chemical, 2019. 285: p. 529-535.
Liu, W., et al., Laminated Paper-Based Analytical Devices (LPAD) with Origami-Enabled Chemiluminescence Immunoassay for Cotinine Detection in Mouse Serum. Analytical Chemistry, 2013. 85(21): p. 10270-10276.
Lu, X., et al., Improving interface adhesion of magnetic particle modified EVA hot melt adhesive through introduction of a thermodynamically compatible component. RSC Advances, 2017. 7(58): p. 36382-36391.
Lu, Y., et al., Fabrication and Characterization of Paper-Based Microfluidics Prepared in Nitrocellulose Membrane By Wax Printing. Analytical Chemistry, 2010. 82(1): p. 329-335.
Magro, L., et al., Paper-based RNA detection and multiplexed analysis for Ebola virus diagnostics. Scientific Reports, 2017. 7(1): p. 1347.
Martinez, A.W., et al., Diagnostics for the Developing World: Microfluidic Paper-Based Analytical Devices. Analytical Chemistry, 2010. 82(1): p. 3-10.
Martinez, A.W., et al., Patterned Paper as a Platform for Inexpensive, Low-Volume Portable Bioassays. Angewandte Chemie International Edition, 2007. 46(8): p. 1318-1320.
Martinez, A.W., et al., Simple Telemedicine for Developing Regions: Camera Phones and Paper-Based Microfluidic Devices for Real-Time, Off-Site Diagnosis. Analytical Chemistry, 2008. 80(10): p. 3699-3707.

\* cited by examiner

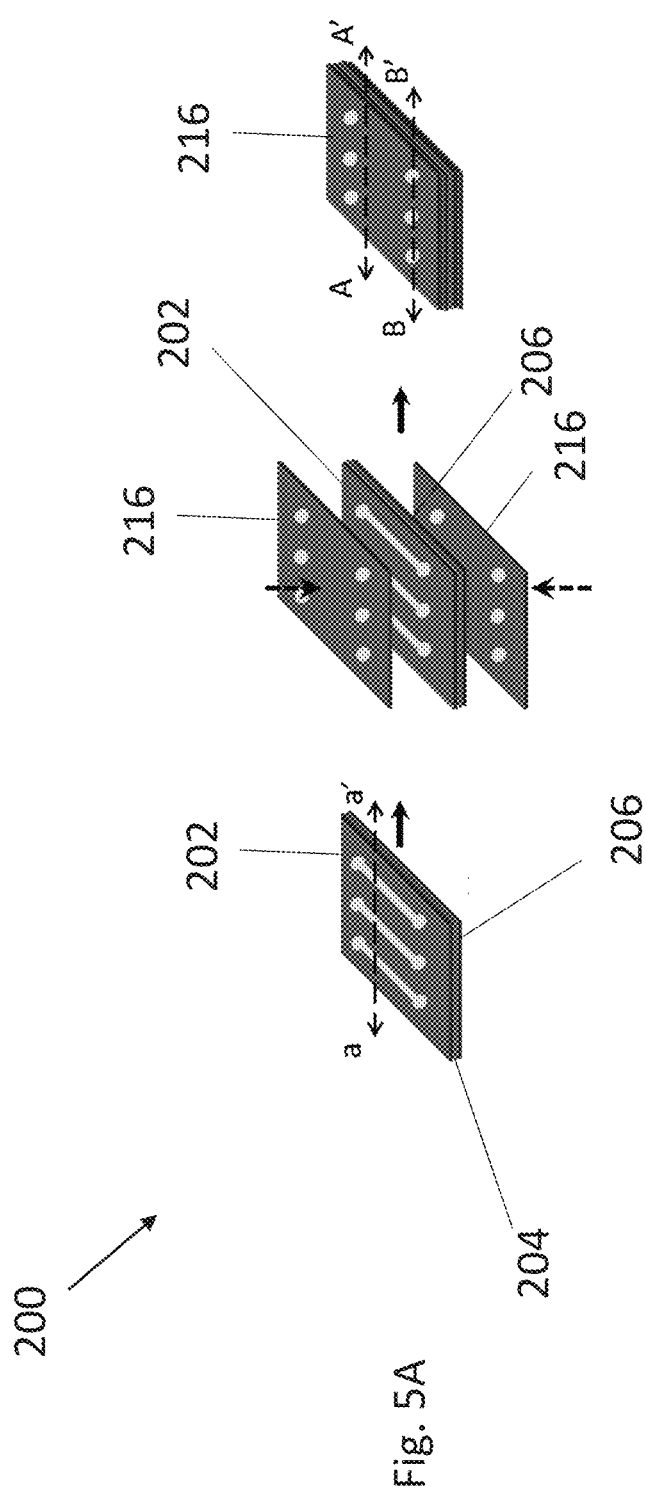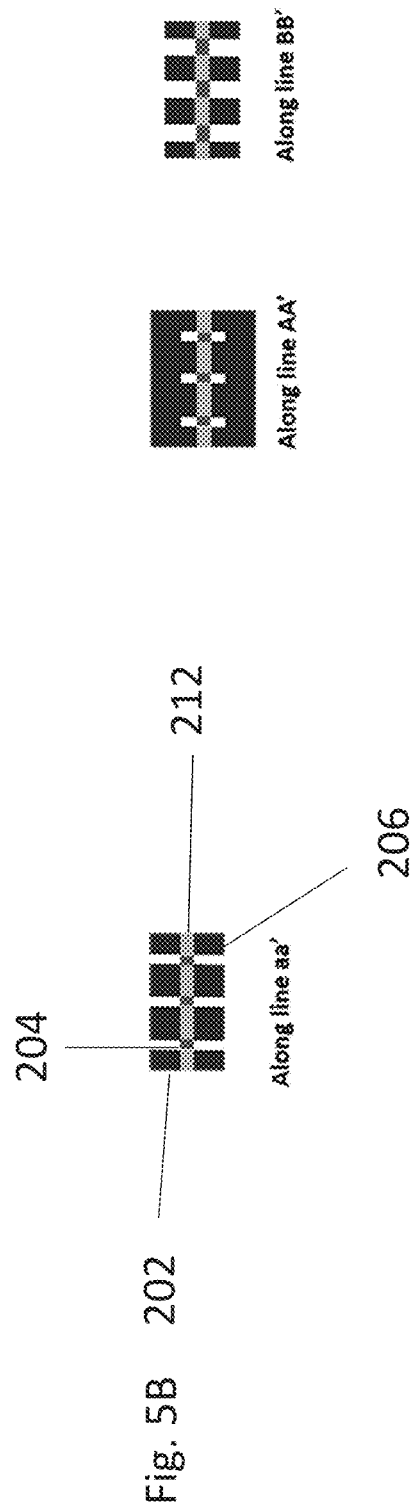
Fig. 5A
Fig. 5B

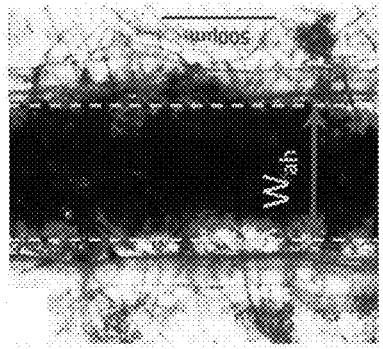 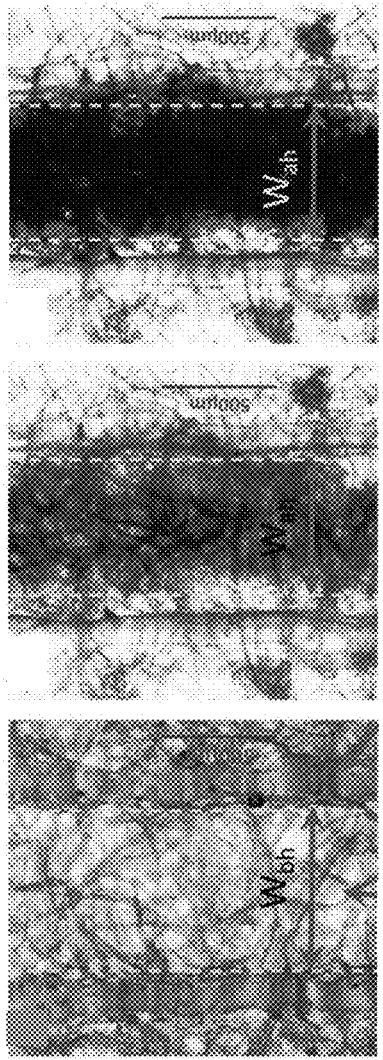 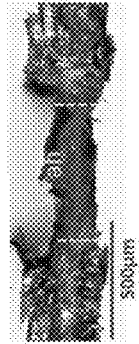 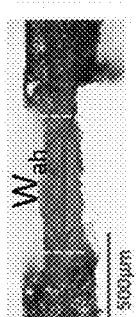 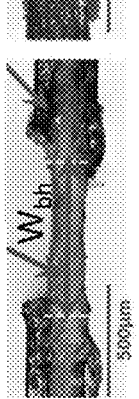 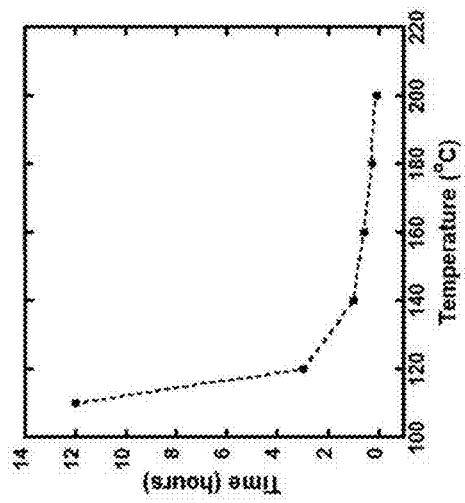 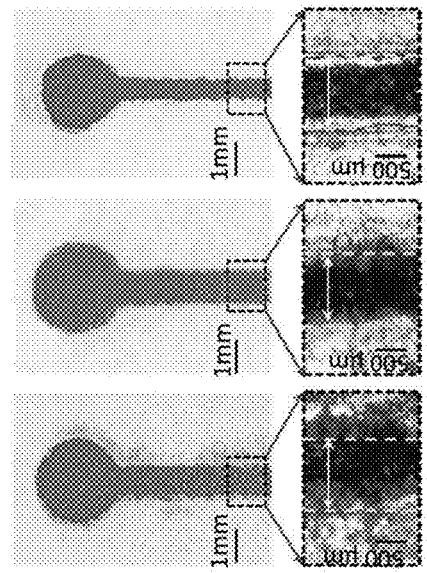

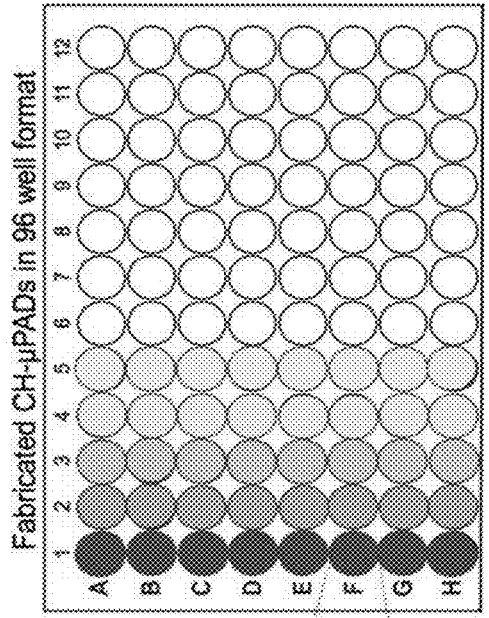
Fig. 12A
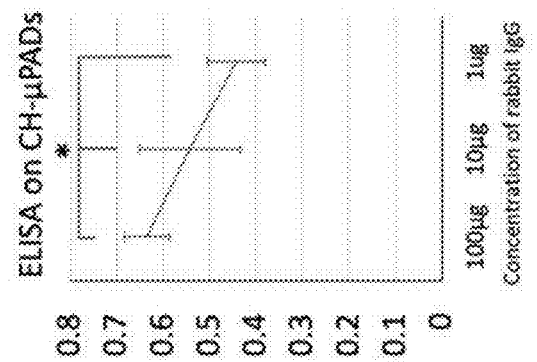
Fig. 12D
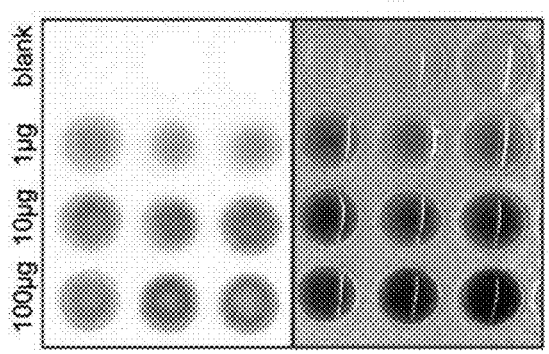
Fig. 12B
Fig. 12C

POROUS SUBSTRATE-BASED MICROFLUIDIC DEVICES

CROSS-REFERENCE TO RELATED APPLICATIONS

This application claims priority to U.S. provisional application No. 63/274,697 filed on Nov. 2, 2021, incorporated herein by reference in its entirety.

BACKGROUND OF THE INVENTION

Paper-based microfluidic devices or microfluidic paper-based analytical devices (microPADs) were first reported in 2007 using lithographical protocols for patterning on a paper sheet (Martinez, A. W. et al., 2007, Angewandte Chemie International Edition, 46(8):1318-1320). The microPADs are fabricated by creating hydrophobic barriers on the paper sheet to create hydrophilic channels and test areas to guide the analytes of interest in a specific direction to the point of interest. As compared to conventional microfluidic devices, microPADs present many distinct advantages such as low-cost, smaller size and ability to function without supporting equipment such as pumps and power sources (Martinez, A. W. et al., 2008, Analytical Chemistry, 80(10):3699-3707). The miniaturization of multiple laboratory functions into paper-based chips integrated with faster response has opened up new opportunities in the field of low-cost portable point of care diagnostics (Oncescu, V. et al., 2013, Lab on a Chip, 13(16):3232-3238; Kumar, A. A. et al., 2015, Angewandte Chemie International Edition, 54(20):5836-5853; Gong, M. M. et al., 2017, Chemical Reviews, 117(12):8447-8480). MicroPADs have shown potential use for various fluidic applications such as food safety and processing (Choi, J. R., et al., 2019, Sensors (Basel, Switzerland), 19(4): 817; Chaiyo, S., et al., 2015, Analytica Chimica Acta, 866:75-83; Choi, J. R., et al., 2016, Lab on a Chip, 16(3): 611-621; Liu, C. C. et al., 2018, Food Chemistry, 249:162-167; Zhang, Y. et al., 2015, Biosensors and Bioelectronics, 68:14-19), environmental monitoring (Chen, Y. et al., 2016, Biosensors & bioelectronics, 81:317-323; Li, B. et al., 2017, ACS Sensors, 2(2):243-250; Wang, P. et al., 2017, Electrochemistry Communications, 81:74-78; Sicard, C. et al., 2015, Water Research, 70:360-369), cell biology (Wang, P. et al., 2017, Electrochemistry Communications, 81:74-78; Sicard, C. et al., 2015, Water Research, 70:360-369; Tao, F. F> et al., 2015, BioChip Journal, 9(2):97-204), drug screening (Hong, B. et al., 2016, Biomedical Microdevices, 18(1): 21; Musile, G. et al., 2015, Analytical Methods, 7(19):8025-8033) and clinical diagnosis (Martinez, A. W. et al., 2010, Analytical Chemistry, 82(1):3-10; Piety, N. Z. et al., 2017, Scientific Reports, 7(1):45488; Hede, M. S. et al., 2018, Scientific Reports, 8(1):4122; Magro, L. et al., 2017, Scientific Reports, 7(1):1347).

Since their introduction, several techniques have been demonstrated to pattern the paper substrates for the fabrication of microPADs. These techniques are based on photolithography (Martinez, A. W. et al., 2007, Angewandte Chemie International Edition, 46(8):1318-1320; Martinez, A. W. et al., 2008, Proceedings of the National Academy of Sciences, 105(50):19606; Klasner, S. A. et al., 2010, Analytical and Bioanalytical Chemistry, 397(5):1821-1829), ink jet printing (Abe, K. et al., 2008, Analytical Chemistry, 80(18): 6928-6934; Abe, K. et al., 2010, Analytical and Bioanalytical Chemistry, 398(2):885-893), plasma treatment (Li, X. et al., 2008, Analytical Chemistry, 80(23):9131-9134), screen printing (Dungchai, W. et al, 2011, Analyst, 136(1):77-82), CVD (Lam, T. et al. 2017, Scientific Reports, 7(1):1188), wax printing (Carrilho, E. et al., 2009, Analytical Chemistry, 81(16):7091-7095; Lu, Y. et al., 2010, Analytical Chemistry, 82(1):329-335), laser treatment (Chitnis, G. et al., 2011, Lab on a Chip, 11(6):1161-1165), flexographic printing (Olkkonen, J. et al., 2010, Analytical Chemistry, 82(24):20246-20250; de Tarso Garcia, P. et al., 2014, RSC Advances, 4(71):37637-37644) and automated/handheld tools (Fenton, E. M. et al., 2009, ACS Applied Materials & Interfaces, 1(1):124-129; Wang, W. et al., 2010, Journal of Chromatography A, 1217(24):3896-3899; Bruzewicz, D.A. et al., 2008, Analytical Chemistry, 80(9):3387-3392; Gha-derinezhad, F. et al., 2017, Scientific Reports, 7(1):3553). Some of these techniques such as ink-jet printing and wax printing are very promising in terms of rapid prototyping, however they each have a set of associated challenges, making them unsuitable for the automated mass fabrication of microPADs (Yetisen, A. K. et al., 2013, Lab on a Chip, 13(12):2210-2251; Li, X. et al., 2012, Biomicrofluidics, 6(1):011301). While techniques such as photolithography, CVD, and plasma treatment produce highly reproducible microPADs with good precision (Akyazi, T. et al., 2018, Analytica Chimica Acta, 1001:1-17), these methods are not cost-effective and involve sophisticated procedures (Akyazi, T. et al., 2018, Analytica Chimica Acta, 1001:1-17; Cate, D. M. et al., 2015, Analytical Chemistry, 87(1):19-41).

Thus, there is a need in the art for low-cost, simple, and robust processes for the fabrication of microPADs. The present invention meets this need.

SUMMARY OF THE INVENTION

In one aspect, the present invention provides a method of manufacturing a microfluidic analytical device that comprises providing a top lamination layer and a bottom lamination layer, wherein each of the top lamination layer and bottom lamination layer comprises an outer layer and an inner layer; cutting out one or more channel spaces from each of the top lamination layer and the bottom lamination layer, wherein the one or more channel spaces form a microfluidic path; positioning at least one middle layer between the top lamination layer and the bottom lamination layer, such that each of the two inner layers face the at least one middle layer; and subjecting the top lamination layer and the bottom lamination layer to a process, wherein the process allows both the inner layers to permeate substantially through the at least one middle layer. In one embodiment, the process comprises heating the top lamination layer and the bottom lamination layer to a temperature sufficient to melt both the inner layers. In one embodiment, the heating temperature ranges between 100-200° C. In one embodiment, the heating duration ranges between 5 minutes to 12 hours. In one embodiment, the outer layer comprises one selected from the group consisting of: a sheet of glass, polymer, plastic, ceramic, metalloid, organic material, acrylic or combinations thereof. In one embodiment, the outer layer comprise polyethylene tetraphalate (PET). In one embodiment, the inner layers of the top lamination layer and the bottom lamination layer comprise a material having a melting point ranging between 60-150° C. In one embodiment, the inner layers of the top lamination layer and the bottom lamination layer comprise ethylene vinyl acetate (EVA). In one embodiment, the process comprises applying sufficient pressure to the top lamination layer and the bottom lamination layer to allow both the inner layers to permeate substantially through the at least one middle layer. In one embodiment, the inner layer of the top lamination layer and the bottom lamination layer permeates the entire thickness of the at least one middle layer. In one embodiment, the method further comprise a step of: placing a cover layer on top of the top lamination layer and on the bottom of the bottom lamination layer, wherein the cover layer is configured to at least partially cover the one or more hydrophilic channel. In one embodiment, the at least one middle layer is made from a material selected from the group consisting of: a cloth, a cellulosic paper, non-cellulosic paper, natural fiber sheet, synthetic sheet and combinations thereof. In one embodiment, the at least one middle layer is porous. In one embodiment, the at least one middle layer has a pore size ranging between a 1 nanometer to 1000 microns.

In one aspect, the present invention provides a microfluidic analytical device (microPAD), comprising: a top lamination layer having an inner layer and an outer layer; a bottom lamination layer having an inner layer and an outer layer; and at least one middle layer positioned between the top lamination layer and the bottom lamination layer; wherein the inner layer of the top lamination layer and the inner layer of the bottom lamination layer are in contact with the at least one middle layer; wherein the top lamination layer and the bottom lamination layer is cut out from a predetermined pattern; and wherein the inner layer of the top lamination layer and the bottom lamination layer is partially diffused through the at least one middle layer to define one or more fluid impervious barriers, leaving the cut areas as hydrophilic channels. In one embodiment, the outer layer comprises one selected from the group consisting of: a sheet of glass, polymer, plastic, ceramic, metalloid, organic material, acrylic or combinations thereof. In one embodiment, the outer layer comprise polyethylene tetraphalate (PET). In one embodiment, the inner layers comprise a material having a melting point ranging between 60-150° C. In one embodiment, the inner layer comprise ethylene vinyl acetate (EVA). In one embodiment, the device further comprises a cover layer positioned on top of the top lamination layer and on the bottom of the bottom lamination layer, wherein the cover layer is configured to at least partially cover the hydrophilic channel. In one embodiment, the at least one middle layer comprises a material selected from the group consisting of: a cloth, a cellulosic paper, non-cellulosic paper, natural fiber sheet, synthetic sheet, and combinations thereof. In one embodiment, the at least one middle layer is porous. In one embodiment, the inner layers of the top lamination layer and the bottom lamination layer comprises a pressure sensitive adhesive.

BRIEF DESCRIPTION OF THE DRAWINGS

The following detailed description of invention will be better understood when read in conjunction with the appended drawings. It should be understood, however, that the invention is not limited to the precise arrangements and instrumentalities of the embodiments shown in the drawings.

FIG. 5A through FIG. 5B depicts device of present invention with selectively open and enclosed areas. FIG. 5A depicts a perspective view of the cover layer creating open and closed channels. FIG. 5B depicts the cross-sectional views of devices with selectively open and enclosed areas.

FIG. 6A depicts lab name and letters that were patterned on qualitative grade plain filter paper sheet. Food color was used as an analyte in the hydrophilic patterned area. FIG. 6B depicts a top view of fabricated 96 well plate showing device dimensions and appearance. FIG. 6C is a schematic showing scalability of the device fabrication process. Multiple devices can be fabricated in the form of an array on an A2/A3/A4 or A5 sheet and cut along the dotted line and used as needed at the point of need. FIG. 6D depicts various device designs fabricated using proposed technique. (i) A micro array showing red color in the 800 micrometers circular hydrophilic wells, (ii) line, (iii) Y and (iv) flower shapes showing mixing of red and green color to generate yellow color after mixing.

FIG. 7A depicts a schematic cross-sectional view of lamination sheets. FIG. 7B depicts a schematic cross-sectional view of lamination sheets with paper sheet in between them and corresponding microscope image after 20 seconds of heating at 160° C. FIG. 7C depicts a schematic image of the lamination sheets with paper sheet in between them after 35 minutes of heating at 160° C. FIG. 7D depicts a microscopic view of lamination sheets. FIG. 7E depicts a microscopic view of lamination sheets with paper sheet in between them and corresponding microscope image after 20 seconds of heating at 160° C. FIG. 7F depicts a microscope image of the lamination sheets with paper sheet in between them after 35 minutes of heating at 160° C. It can be seen clearly from FIG. 7E and FIG. 7F, the EVA layer diffused completely in the paper sheet during the heating process, creating hydrophobic barrier.

FIG. 8A depicts a top view of the porous paper sheet made of cellulose fiber. FIG. 8B depicts a cross-sectional view of the paper sheet made of layers of cellulose fibers; the thickness of paper sheet was approximately 160 μm. FIG. 8C depicts paper sheet sandwiched between lamination sheets having a 700±50 μm wide channel cut in them, the device was heated for 20 seconds at 160° Celsius just to hold the paper sheet, $w_{bh}$=700±50 μm is width of channel before heating. FIG. 8D depicts cross-sectional view of device in FIG. 8C, open and sandwiched paper regions where $t_{bh}$=360 μm was the thickness of the sandwiched region before heating. FIG. 8E depicts paper sandwiched device in FIG. 8C was heated on a hot plate for 35 minutes at a temperature of 160° Celsius to make the sandwiched area hydrophobic and leave open paper area hydrophilic. As the device got heated, EVA melted and diffused in the porous paper sheet vertically and laterally in the device channel near the channel walls. FIG. 8F depicts a cross-sectional view of device in FIG. 8E, showing device thickness $t_{ah}$=310 μm and channel width $w_{ah}$=600±50 μm after heating. The device thickness and channel width decreased after heating as EVA diffused vertically in the paper sheet and laterally in the channel region.

FIG. 9A through FIG. 9J depicts a microfluidic channel shown under the optical microscope. FIG. 9A depicts a top view of the device after heating for 20 seconds at 160° C., making sandwiched area completely hydrophobic and leaving open area hydrophilic. FIG. 9B depicts a cross-sectional view of the device after heating for 20 seconds at 160° C., making sandwiched area completely hydrophobic and leaving open area hydrophilic. FIG. 9C depicts a top view of the device after heating for 1 hour at 160° C. FIG. 9D depicts a cross-sectional view of the device after heating for 1 hour at 160° C., making sandwiched area completely hydrophobic and leaving open area hydrophilic. FIG. 9E depicts a top view of the device having rhodamine b in the hydrophilic channel area. FIG. 9F depicts a cross-sectional view of the device with rhodamine b in the hydrophilic channel area. FIG. 9G depicts a top view of the device heated for 20 minutes at 160° C., showing leakage of food color. The heating for 20 minutes at 160° C. was insufficient to diffuse EVA in the paper sheet to make it completely hydrophobic outside of the channel regions. The inset shows zoomed areas under the microscope. FIG. 9H depicts a top view of the device heated for 35 minutes at 160° C., showing good confinement of the food color in the channel region. The inset shows zoomed areas under the microscope. FIG. 9I depicts a top view of the device heated for 60 minutes at 160° C., showing reduced channel width because of the overheating. The inset shows zoomed areas under the microscope. FIG. 9J depicts heating temperature vs. time taken for EVA to completely diffuse (vertically) in the paper sheet in the sandwiched paper area with minimal diffusion in the open channel regions.

FIG. 10A depicts that 0.3±0.05 mm was minimum channel width obtained with repeated devices (n=10). The devices were fabricated with 2 mm reservoir and channel widths ranging from 0.2 mm to 1 mm and channel length of 10 mm. The devices were introduced with 5 microliters of food color at one end of the device for visual confirmation and size measurements. FIG. 10B depicts insets in FIG. 10A showing zoomed areas under the microscope. FIG. 10C depicts flow of various acids, bases and solvents mixed with food color in a 1 mm wide and 10 mm long channel showing stability of CH-microPADs. Acetonitrile and THF showed some leakage at the introduction in the inlet port, other chemicals showed very good stability. FIG. 10D depicts insets in FIG. 10C showing zoomed area at the inlet port.

FIG. 11A depicts that the live-dead staining showed remarkably enlarged green fluorescing (live cells) colonies by 72 hrs. compared to 24 hrs. The red florescence (dead cells) intensity of cells was less compared to the green as observed at 72 hrs., indicating excellent cell compatibility and viability. FIG. 11B depicts that the MTT assay showed significant (*P<0.00001) cell proliferation on CH-microPADs at 48 hours and 72 hours compared to 24 hours.

FIG. 12A through FIG. 12D depicts direct ELISA (enzyme-linked immunosorbent assay) based immune-detection on CH-microPADs. FIG. 12A depicts a schematic representation of the ELISA on the CH-microPADs. The colorimetric signal is based on the concentration of rabbit IgG coated on the fabricated CH-microPAD microwells. FIG. 12B depicts a scanned image of the ELISA reaction on the CH-microPADs. FIG. 12C depicts an image of the color development captured using an iPhone camera. FIG. 12D depicts the graph plotted based on the colorimetric reaction analysis using a microplate reader. The color development was directly proportional to the concentration of rabbit IgG coated on the well. The result was statistically significant (*p<0.05) between each concentration tested.

As shown in FIG. 14A, the devices were cut in the well-plate format in the lamination sheets with inward EVA side and PET sides outward. When heating on the hotplate, EVA on the lamination sheets slowly melts and impregnates in the paper sheet. The impregnated EVA forms the hydrophobic barriers on the paper and leaving hydrophilic circular paper regions in the cut areas on the lamination sheets. Another lamination sheet was then put on the bottom side to cover the open circular regions to form wells to hold liquid analytes. FIG. 14B shows the cross-sectional view along the dotted line in FIG. 14A.

FIG. 15A is a picture of a fabricated paper well plate. FIG. 15B shows a top-view showing section of a well from the well plate in FIG. 15A. FIG. 15C shows the spread of food color only in the hydrophilic well area, not in the outside hydrophobic region created because of impregnation of melted EVA during heating process. FIG. 15D shows SEM image showing top view of the filter paper sheet made of cellulose fibers. FIG. 15E is a SEM image of the section of a well along the dotted box in FIG. 15B before heating. FIG. 15F shows SEM image of the section of a well along the dotted box in FIG. 15B after heating, while heating the EVA melts and covers well area near the walls as shown with red arrows. FIGS. 15G-15I shows SEM cross-sectional view of the images in FIGS. 15D, 15E, and 15F respectively.

FIG. 17B shows the specificity assay using spiked mock serum. FIG. 17C shows the specificity assay using spiked complex biological solution.

DETAILED DESCRIPTION OF THE INVENTION

Figure 1:
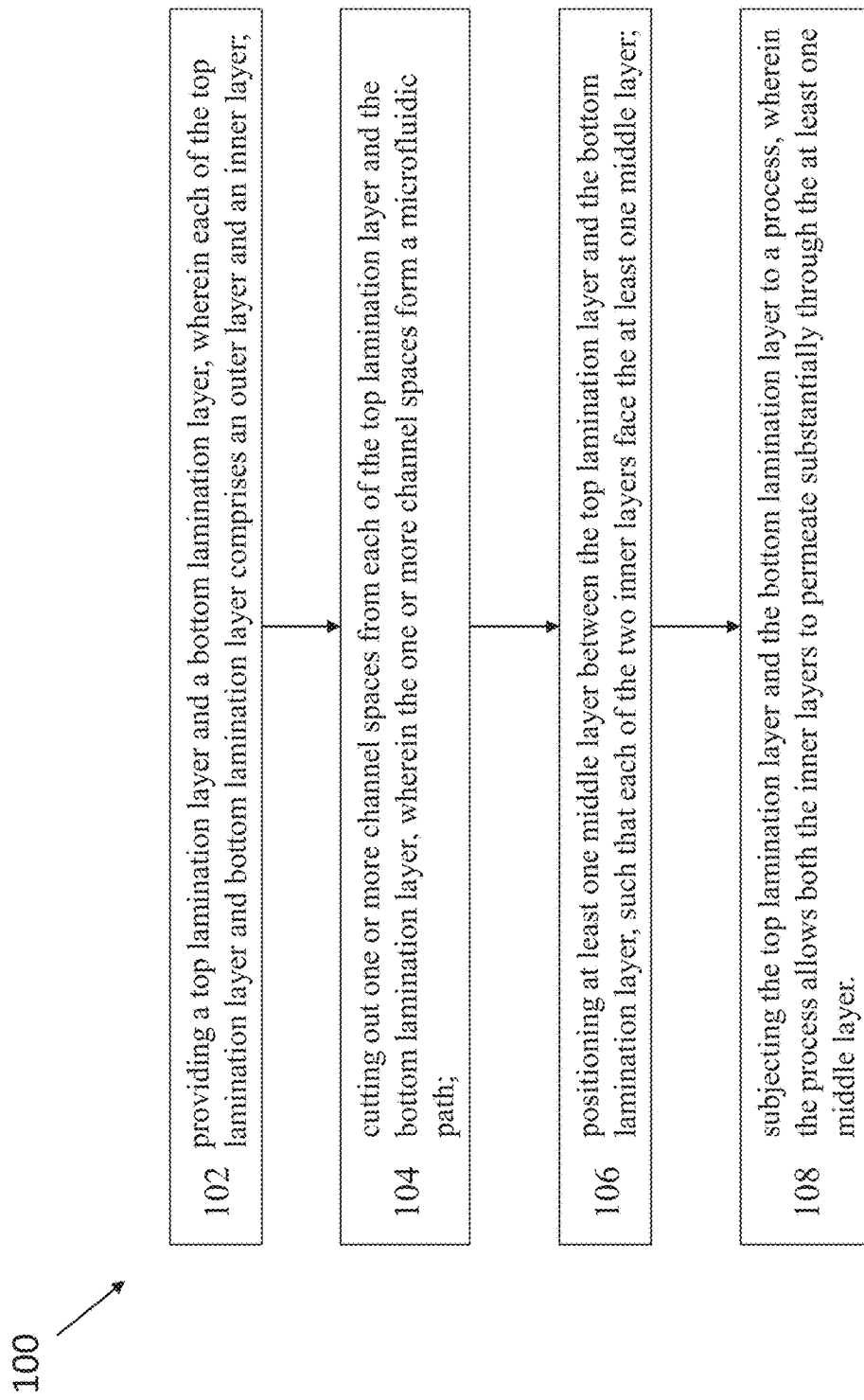
FIG. 1 is a flowchart depicting an exemplary method of manufacturing the paper-based microfluidic device of the present invention.

It is to be understood that the figures and descriptions of the present invention have been simplified to illustrate elements that are relevant for a clear understanding of the present invention, while eliminating, for the purpose of clarity many other elements found in the field of microfluidic devices. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Definitions

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

A Method of Manufacturing a Paper-Based Microfluidic Device

The present invention provides a method of manufacturing a microfluidic paper-based analytical device (microPAD). In one embodiment, the method of present invention is configured to allow for rapid fabrication of microPADs. The microPAD devices are lightweight, disposable, low-cost, simple fabrication and ease of operation point of care devices. The microPAD devices enable fluid transport via capillary action without the need of external pumps and power supply because of their hydrophilic and porous nature as compared to microfluidic devices made with glass, silicon and/or polymers. In one embodiment, the method of the present invention provides a promising technique for practical applications in both resource-limited settings and developed places. Further, the method is suitable for mass fabrication with minimal fabrication steps, low cost, good mechanical strength and high precision and reproducibility. In one embodiment, the method of present invention may be automated and involve minimal human intervention. In one embodiment, the method of the present invention circumvents the use of clean room facilities and harsh chemicals making it easily accessible for point of use fabrication of microPAD devices. In one embodiment, the method of the present invention provides microPAD devices that may be applicable for use in areas including but not limited to clinical diagnostics, biological applications, sensing applications, food processing, chemical industry, etc. In one embodiment, the microPAD devices of the present invention may be used as an immunodiagnostic device.

Referring now to FIG. 1, an exemplary method 100 of manufacturing a microfluidic analytical (microPAD) device of the present invention is depicted. Method 100 begins with step 102, wherein a top lamination layer and a bottom lamination layer is provided, wherein each lamination layer comprises an outer layer and an inner layer.

In step 104, one or more channel spaces are cut out from the at least one of the top lamination layer and the bottom lamination layer, wherein the one or more channel spaces form a microfluidic path.

In step 106, at least one middle layer is positioned between the top lamination layer and the bottom lamination layer, such that each of the two inner layers face the at least one middle layer. In one embodiment, the at least one middle layer is porous.

In step 108, the top lamination layer and the bottom lamination layer are subjected to a process, wherein the process allows both the inner layers to permeate substantially through the at least one middle layer. In one embodiment, the process may comprise heating the top lamination layer and the bottom lamination layer to a temperature sufficient to melt both the inner layers. In one embodiment, the top lamination layer and the bottom lamination layer may be heated to a temperature ranging between 100-200° C. In one embodiment, the top lamination layer and the bottom lamination layer may be heated for a duration ranging between 5 minutes to 12 hours. In one embodiment, the process may comprise putting sufficient pressure to the top lamination layer and the bottom lamination layer. In one embodiment, the inner layers may comprise pressure sensitive adhesives, such that when the top lamination layer and the bottom lamination layer are pressed together, the inner layers permeate through the at least one middle layer. The inner layers diffuse into the at least one middle layer only in areas covered by the top lamination layer and the bottom lamination layer. In one embodiment, the diffused inner layers define one or more fluid impervious barriers in the at least one middle layer. In one embodiment, the inner layers do not diffuse into channel spaces, thereby forming hydrophilic regions of the at least one middle layer in the channel space.

Figure 2:
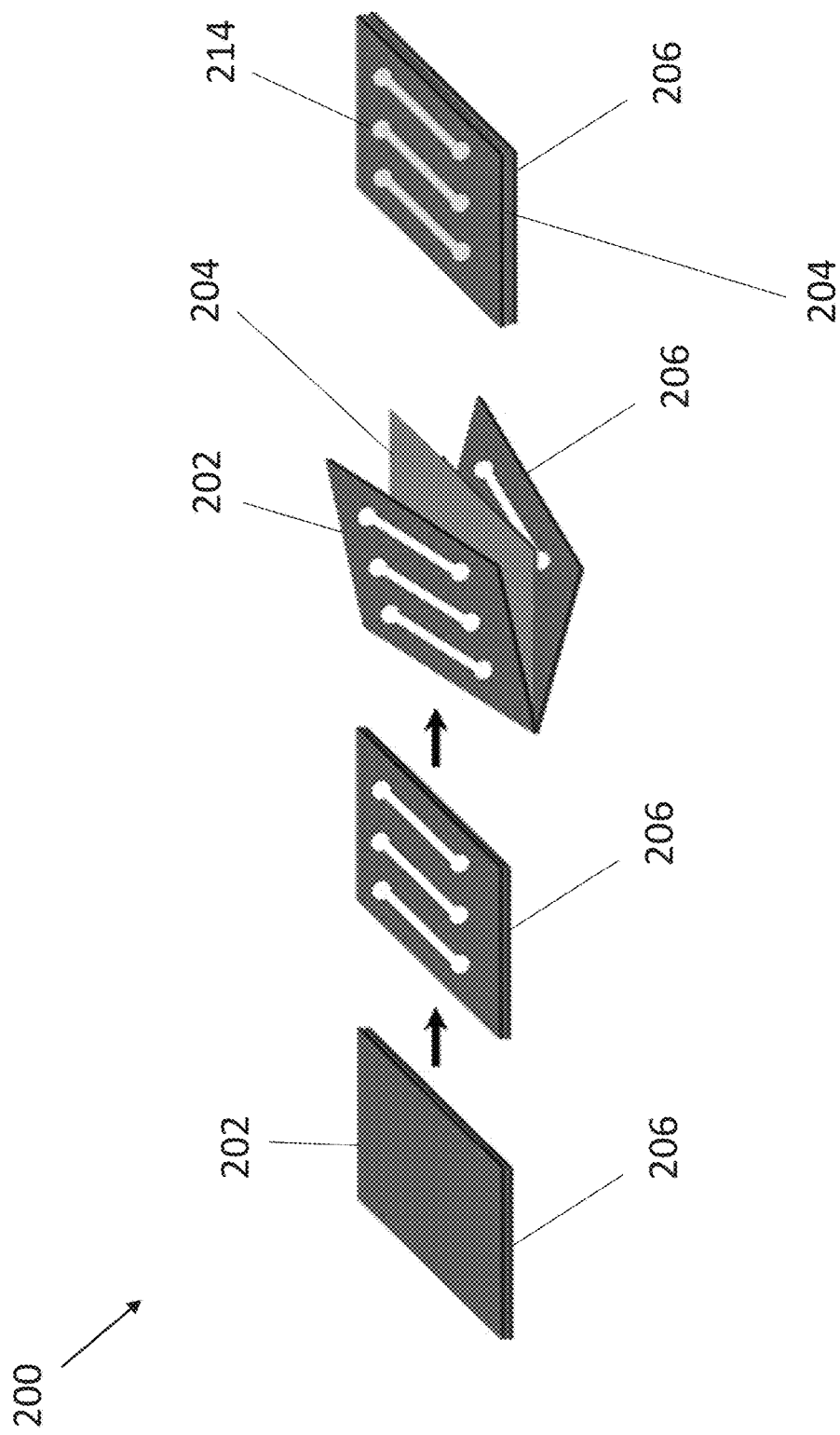
FIG. 2 depicts a perspective view of the paper-based microfluidic device (microPAD) of the present invention.
Figure 3:
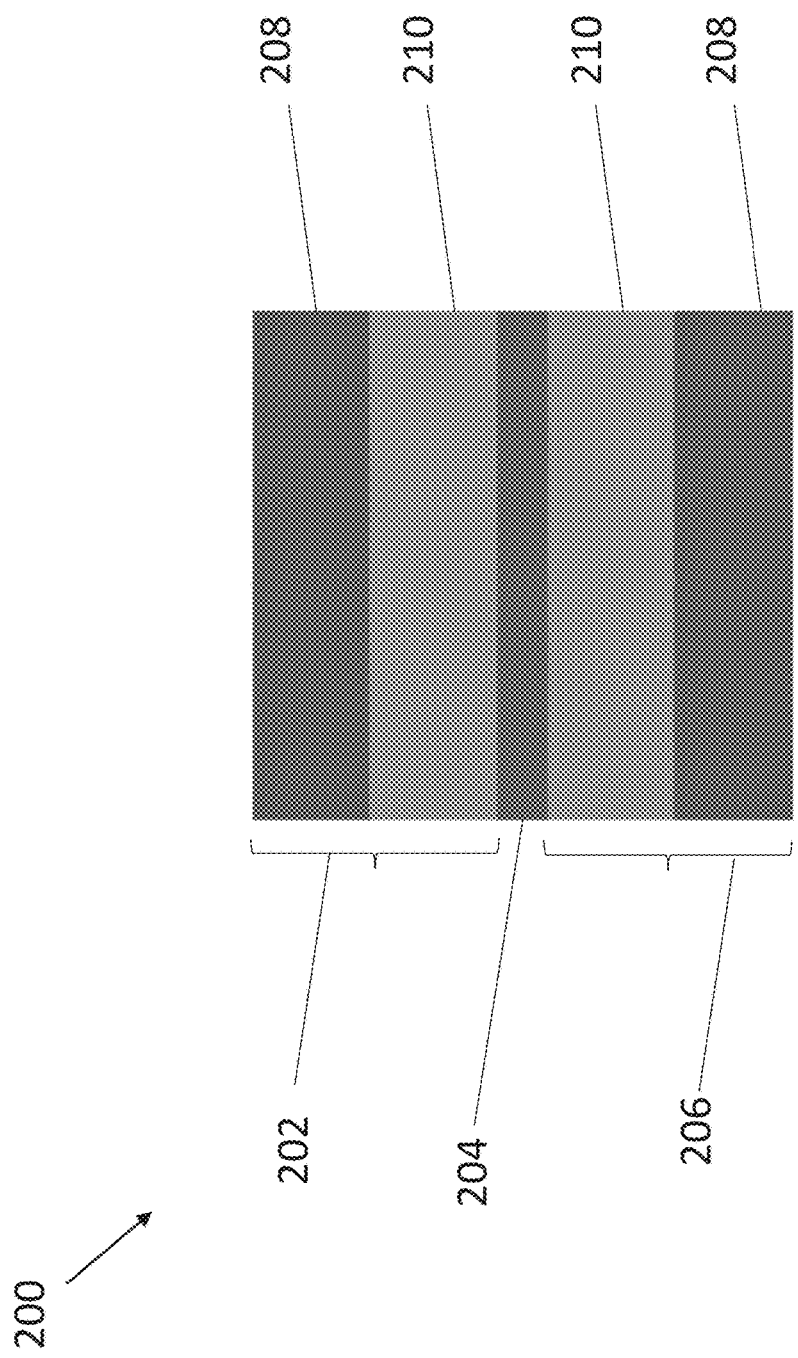
FIG. 3 depicts a cross sectional view of different layers of the device of the present invention.
Figure 4:
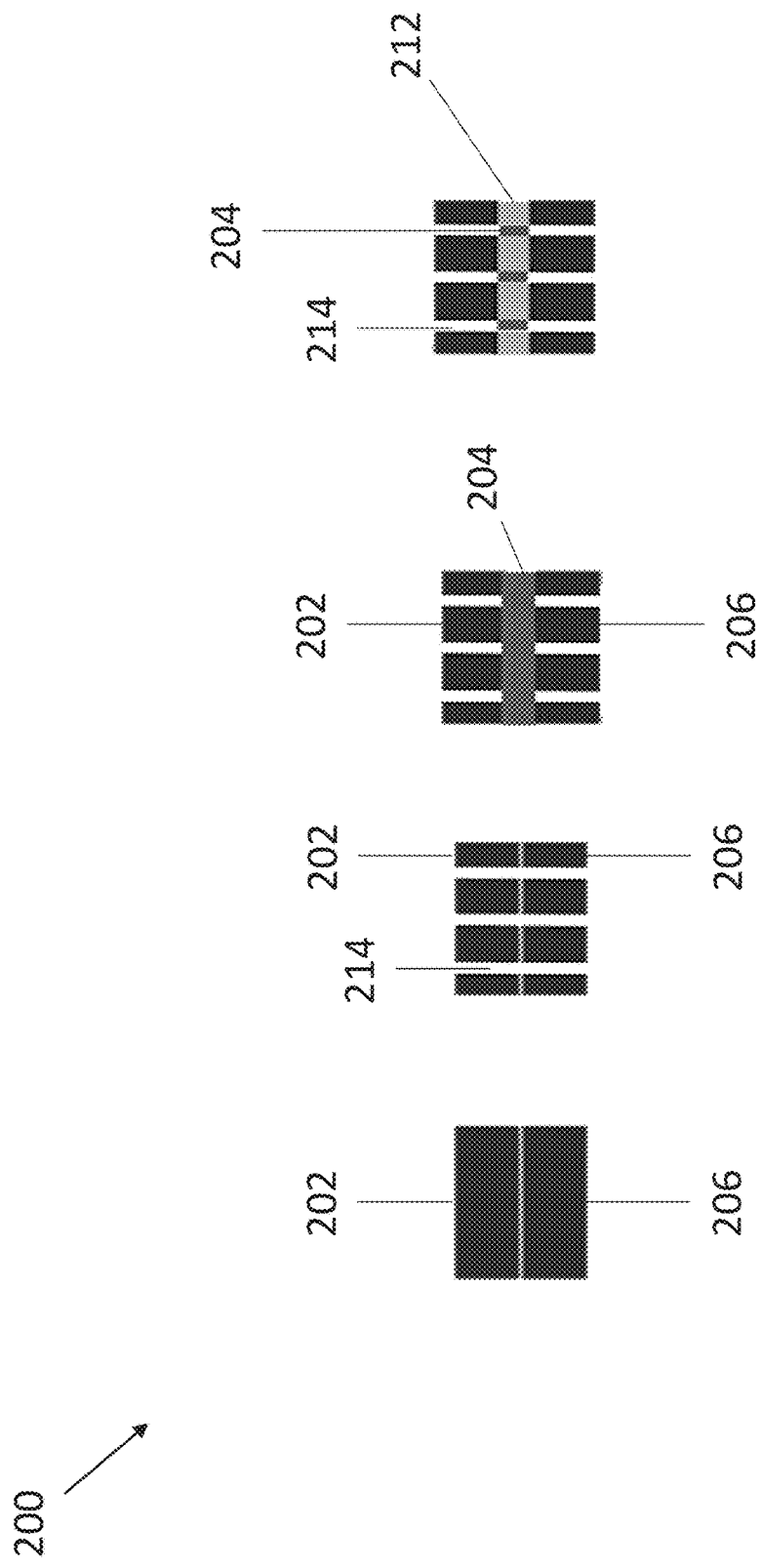
FIG. 4 depicts a cross sectional view of the device before and after heating.

Referring now to FIG. 2, FIG. 3, and FIG. 4, method 100 is schematically illustrated to manufacture an exemplary microPAD device 200. MicroPAD device 200 comprises a top lamination layer 202, at least one middle layer 204, and a bottom lamination layer 206.

Top lamination layer 202 and bottom lamination layer 206 each comprise an outer layer 208 and an inner layer 210, wherein outer layer 208 faces outward and inner layer 210 faces toward at least one middle layer 204 (FIG. 3). In one embodiment, top lamination layer 202 may have a thickness ranging between approximately 20-500 microns depending on need and application. In one embodiment, bottom lamination layer 206 may have a thickness ranging between approximately 20-500 microns depending on need and application. In one embodiment, top lamination layer 202 and bottom lamination layer 206 may have the same thickness. In one embodiment, top lamination layer 202 may be thicker than bottom lamination layer 206. In one embodiment, bottom lamination layer 206 may be thicker than top lamination layer 202. In one embodiment, top lamination layer 202 and bottom lamination layer 206 together may have a thickness ranging between 40-1000 microns depending on need and application. In one embodiment, top lamination layer 202 and bottom lamination layer 206 together may have a thickness of 125 microns.

Outer layer 208 may be made from any material including but not limited to a sheet of glass, polymer, plastic, ceramic, metalloid, organic material, acrylic, etc. In one embodiment, outer layer 208 may comprise polyethylene tetraphalate (PET). In one embodiment, outer layer 208 may comprise polycarbonate. In one embodiment, outer layer 208 may have any shape known to one skilled in the art, including but not limited to circular, rectangular, oval, square, etc. In one embodiment, outer layer 208 may have any thickness known to one skilled in the art ranging between approximately 20-400 microns depending on need and application.

Inner layer 210 may be made from any material having a melting point between about 60-200° C. In one embodiment, inner layer 210 may be made from any material known to one skilled in the art including but not limited to polymers. In one embodiment, inner layer 210 may be made from any material that has a melting temperature less than the melting temperature of outer layer 208. In one embodiment, inner layer 210 comprises ethylene vinyl acetate (EVA). In one embodiment, EVA has a melting temperature ranging between 90-120° C. depending on the ratio of vinyl acetate and ethylene. In one embodiment, inner layer 210 may be made from insect waxes, vegetable waxes, mineral waxes, petroleum waxes, microcrystalline waxes, synthetic waxes, or combinations thereof. In one embodiment, inner layer 210 may be made from beeswax, carnauba wax, candelilla wax, paraffin, ceresin, ozokerite, polyethylene waxes, Fischer-Tropsch waxes, and silicone waxes such as alkyl- or alkoxydimethicones having 16 to 45 carbon atoms, silicon, Polydimethylsiloxane (PDMS), etc. In one embodiment, inner layer 210 may be made from pressure sensitive adhesives including but not limited to solvent-acrylic pressure sensitive adhesives, emulsion-acrylic pressure sensitive adhesives, solvent-rubber pressure sensitive adhesives, rubber-based hot melt pressure sensitive adhesives, UV curable pressure sensitive adhesives, etc. In one embodiment, inner layer 210 may have any shapes known to one skilled in the art, including but not limited to circular, rectangular, oval, square, etc. In one embodiment, inner layer 210 may have any thickness known to one skilled in the art ranging from approximately 20-400 microns.

Top lamination layer 202 and bottom lamination layer 206 may be patterned with any design. The patterns are cut out from top lamination layer 202 and bottom lamination layer 206, creating one or more channel spaces. Any method known to one skilled in the art including but not limited to laser-cutting, etching, stamping, etc. may be used to create the one or more channel spaces. In one embodiment, computer-assisted design can be used to determine a preselected pattern. For example, a pattern can be designed using a suitable computer graphics program, and the pattern can be subsequently placed on top lamination layer 202 and bottom lamination layer 206 and cut out. Such computer-assisted design can be used to consistently reproduce a pattern several times to create similar microPAD devices. In one embodiment, top lamination layer 202 and bottom lamination layer 206 are designed to have a line pattern. In one embodiment, top lamination layer 202 and bottom lamination layer 206 are designed to have a Y shape pattern. In one embodiment, top lamination layer 202 and bottom lamination layer 206 are designed to have a flower pattern. In one embodiment, top lamination layer 202 and bottom lamination layer 206 are designed to have a circular array pattern.

In one embodiment, top lamination layer 202 and bottom lamination layer 206 are designed to have a well-plate format. In one embodiment, any well-plate can be patterned including but not limited to 6, 12, 24, 48, 96, 384 or 1536 sample well size. In an embodiment, the wells may be circular-shaped. In another embodiment, the wells may be lines or linearly arranged. In an embodiment, the wells may be Y-shaped. In an embodiment, the wells may be flower shaped. Possible well shapes can be further seen and explained below in FIG. 6D. In one embodiment, top lamination layer 202 and bottom lamination layer 206 may be provided pre-cut with any design known to one skilled in the art. In one embodiment, only top lamination layer 202 may be patterned. In one embodiment, only bottom lamination layer 206 may be patterned.

At least one middle layer 204 is positioned between top lamination layer 202 and bottom lamination layer 206. In one embodiment, at least one middle layer 204 may be made from a woven material. In one embodiment, at least one middle layer 204 may be made from a non-woven material. In one embodiment, at least one middle layer 204 may comprise materials including but not limited to polyester fibers, polyamide fibers, aramid fibers, polypropylene fibers, copolyetherester fibers, polyethylene terephthalate fibers, polybutylene terephthalate fibers, polypropylene fibers, polyethylene fibers, polyvinyl acetate fibers, polyvinyl alcohol fibers (including various hydrolysis of polyvinyl alcohol such as 88% hydrolyzed, 95% hydrolyzed, 98% hydrolyzed and 99.5% hydrolyzed polymers), polylactic acid fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46).

In one embodiment, at least one middle layer 204 comprises cloth. In one embodiment, at least one middle layer 204 comprises synthetic sheets. In one embodiment, at least one middle layer 204 comprises polymer sheets. In one embodiment, at least one middle layer 204 comprises paper sheets including but not limited to tissue paper, printing paper, filter paper, etc.

In one embodiment, at least one middle layer 204 comprises natural material including but not limited to cotton, wood, bagasse, kenaf, recycled fiber, combinations thereof, and the like. In one embodiment, middle layer 204 may be cellulosic, non-cellulosic, or a combination thereof. In one embodiment, middle layer 204 comprises cellulose paper. In one embodiment, the cellulosic paper substrate can be of a homogenous or multi-layered construction. In one embodiment, at least one middle layer 204 comprises cellulosic paper, which can be of a single ply or a multi-ply construction. In one embodiment, at least one middle layer 204 may be made from A2, A3, A4 or A5 sheets. In one embodiment, at least one middle layer 204 comprises inorganic fibers such as carbon/graphite fiber, metal fiber, metal oxide fiber, ceramic fiber, and combinations thereof. In one embodiment, at least one middle layer 204 may comprise silk. In one embodiment, at least one middle layer 204 may comprise natural occurring fibers including but not limited to jute, flax, ramie, etc. In one embodiment, at least one middle layer 204 may comprise animal fibers including but not limited to alpaca, angora, cashmere, mohair, wool, etc.

In one embodiment, one or more middle layers 204 may be made of the same material. In one embodiment, one or more middle layers 204 may be made from different materials.

In one embodiment, at least one middle layer 204 comprises a plurality of pores. In one embodiment, at least one middle layer 204 may have pore sizes ranging between 1 nanometer to 1000 microns. In one embodiment, at least one middle layer 204 may have pore sizes smaller than 100 nm. In one embodiment, at least one middle layer 204 may have pore sizes ranging between 100 nm-100 microns. In one embodiment, at least one middle layer 204 may have pore sizes ranging between 100-500 microns. In one embodiment, at least one middle layer 204 may have pore sizes larger than 500 microns. In one embodiment, a middle layer with different material and pore sizes may be used based on different applications. In one embodiment, at least one middle layer 204 may have any thickness ranging between 10 nanometers to a 1000 micron. In one embodiment, at least one middle layer 204 may have any thickness ranging between 500 nanometers to a 1000 micron. In one embodiment, different thicknesses of at least one middle layer 204 may be used based on different applications.

Top lamination layer 202, at least one middle layer 204 and bottom lamination layer 206 may be attached together by heat. In one embodiment, top lamination layer 202, at least one middle layer 204 and bottom lamination layer 206 may be attached together by pressure. In one embodiment, device 200 is heated on a hot plate to allow both inner layers 210 to melt and diffuse into at least one middle layer 204 (FIG. 4). In one embodiment, any heating element known to one skilled in the art may be used to heat device 200. In one embodiment, device 200 is heated to a temperature ranging between 100-200° C. In one embodiment, device 200 is heated for any duration ranging between 5 minutes to 12 hours. In one embodiment, the top lamination layer and the bottom lamination layer is heated for 20 minutes at 160° C. In one embodiment, the top lamination layer and the bottom lamination layer is heated for 35 minutes at 160° C. In one embodiment, the top lamination layer and the bottom lamination layer is heated for 60 minutes at 160° C.

Heating top lamination layer 202 and bottom lamination layer 206, causes diffusion of inner layer 210 into at least one middle layer 204 without entering regions of at least one middle layer 204 exposed by the one or more channel spaces.

This heat treatment creates hydrophobic barriers 212 comprising diffused inner layer 210 into at least one middle layer 204 and hydrophilic channels 214 in the pattern of one or more channel spaces. The hydrophilic channels 214 comprise lateral walls formed from the removal (e.g., patterned laser-cutting) of portions of the top lamination layer 202 and/or bottom lamination layer 206. Further, the hydrophilic channels 214 comprise a bottom surface comprising a hydrophilic region of the at least one middle layer 104. In one embodiment, one or more hydrophilic channels 214 may have any width known to one skilled in the art. In one embodiment, one or more hydrophilic channels 214 may have a width ranging between approximately 100 microns to 10 mm. In one embodiment, one or more hydrophilic channels 214 may have any length known to one skilled in the art. In one embodiment, one or more hydrophilic channels may have a length ranging between 1-100 mm. In one embodiment, one or more hydrophilic channels 214 may be created based on different patterns designed and cut on top lamination layer 202 and bottom lamination layer 206.

In one embodiment, one or more outer layer 210 may be positioned on top of top lamination layer 202 to increase the depth of one or more hydrophilic channels 214. In one embodiment, the additional one or more outer layers 210 may have any thickness known to one skilled in the art. In one embodiment, the additional one or more outer layers 210 may have the same thickness as the first positioned outer layer 210. In one embodiment, the additional one or more outer layers 210 may be thinner than the first positioned outer layer 210.

Referring now to FIG. 5A and FIG. 5B, in one embodiment, device 200 may further comprise a cover layer 216. Cover layer may be positioned on top of top lamination layer 202 or below bottom lamination layer 206. Cover layer 216 is configured to at least partially cover one or more hydrophilic channels 214. In one embodiment, cover layer 216 may have open channels where cover layer 216, top lamination layer 202, and bottom lamination layer 206 are all cut out. In one embodiment, open channels may be used as inlets and/or analyte injection ports. In one embodiment, cover layer 216 may be made from any material including but not limited to Polyethylene terephthalate (PET), polycarbonate, Polytetrafluoroethylene (PTFE), acrylic, Polyvinyl chloride (PVC). In one embodiment, cover layer 216 may comprise any other polymer material known to one skilled in the art. In one embodiment, cover layer 216 may have any shape known to one skilled in the art, including but not limited to circular, rectangular, oval, square, etc. In one embodiment, cover layer 216 may have any thickness ranging between approximately 10 microns-1 mm. In one embodiment, cover layer 216 may be attached to top lamination layer 202 with any mechanism known to one skilled in the art including but not limited to normal adhesives, epoxy adhesives, Polyurethane adhesives, contact adhesives, thermosetting adhesives, pressure sensitive adhesives, hot melt adhesives, etc.

In one embodiment, device 200 can be used for diagnostics and other analytical applications, such as to detect an analyte of interest. In one embodiment, reagents are administered to the one or more hydrophilic channels 214 to detect the presence of analytes in a fluid (e.g., a biological sample). In some embodiments, the response to the analyte is visible to the naked eye. For example, to the administered reagents provide a color indicator of the presence of the analyte. Indicators may include molecules that become colored in the presence of the analyte, change color in the presence of the analyte, or emit fluorescence, phosphorescence, or luminescence in the presence of the analyte. In other embodiments, radiological, magnetic, optical, and/or electrical measurements can be used to determine the presence of proteins, antibodies, or other analytes.

In some embodiments, to detect a specific protein, one or more hydrophilic channels 214 can be derivatized with reagents, such as small molecules, that selectively bind to or interact with the protein. Or, for example, to detect a specific antibody, one or more hydrophilic channels 214 can be derivatized with reagents such as antigens, that selectively bind to or interact with the antibody to be detected. In one embodiment, the hydrophilic channels comprise one or more antibodies, or antibody fragments, that selectively bind a peptide or protein to be detected. In one embodiment, the hydrophilic channels comprise one or more nucleic acid probes, that selectively binds a nucleic acid molecule or sequence to be detected. For example, reagents such as small molecules, antibodies, antibody fragments, nucleic acid probes, and/or proteins can be covalently or non-covalently linked to at least one middle layer 204 of one or more hydrophilic channels 214, using similar chemistry to that used to immobilize molecules on beads or glass slides, or using chemistry used for linking molecules to carbohydrates. In alternative embodiments, the reagents may be applied and/or immobilized by applying them from solution and allowing the solvent to evaporate. The reagents can be immobilized by physical absorption onto at least one middle layer 204 positioned within one or more hydrophilic channels 214 by other non-covalent interactions. In general, a wide variety of reagents can be used to detect analytes and can be applied by a variety of suitable methods. These reagents could include antibodies, nucleic acids, aptamers, molecularly imprinted polymers, chemical receptors, proteins, peptides, inorganic compounds, and organic small molecules. These reagents could be adsorbed to at least one middle layer 204 positioned within one or more hydrophilic channels 214 (non-covalently through non-specific interactions), or covalently (as either esters, amides, imines, ethers, or through carbon-carbon, carbon-nitrogen, carbon-oxygen, or oxygen-nitrogen bonds).

In one embodiment, one or more middle layers 204 may further comprise nanoparticles, enzymes, oligonucleotides, etc. to enhance detection capabilities of device 200. In one embodiment, one or more middle layers 204 may comprise silver nanoparticles.

However, the interaction of some analytes with some reagents may not result in a visible color change, unless the analyte was previously labeled. one or more hydrophilic channels 214 can be additionally treated to add a stain or a labeled protein, antibody, nucleic acid, or other reagent that binds to the target analyte after it binds to the reagent in one or more hydrophilic channels 214 and produces a visible color change.

In one embodiment, device 200 may be used for assaying small volumes of biological samples, e.g., fluid samples. Biological samples that can be assayed using the devices described herein include, e.g., urine, whole blood, blood plasma, blood serum, cerebrospinal fluid, ascites, tears, sweat, saliva, excrement, gingival crevicular fluid, or tissue extract.

In some embodiments, a single drop of liquid, e.g., a drop of blood from a pinpricked finger, is sufficient to perform assays providing a simple yes/no answer to the presence of an analyte, or a semi-quantitative measurement of the amount of analyte that is present in the sample, e.g., by performing a visual or digital comparison of the intensity of the assay to a calibrated color chart. However, in order to obtain a quantitative measurement of an analyte in the liquid, a defined volume of fluid is typically deposited in the device. Thus, in some embodiments, a defined volume of fluid (or a volume that is sufficiently close to the defined volume to provide a reasonably accurate readout) can be obtained by creating a pattern in the lamination layers to include a sample well that accepts a defined volume of fluid. For example, in the case of a whole blood sample, the subject's finger could be pinpricked, and then pressed against the sample well until the well was full, thus providing a satisfactory approximation of the defined volume.

In one embodiment, device 200 may be used in a number of different applications. For example, it can be useful for pediatric physicians (for diagnosis of dehydration in infants or other patients in which it is difficult to obtain large volumes of urine); physicians working in resource-poor settings such as developing countries (for diagnosing dehydration in environments where the cost of the assays or the availability of electricity for running instruments are of primary concern); physicians working in emergency or point-of-care environments (as a method for detecting dehydration rapidly); nurses or caregivers in nursing homes (for testing dehydration in the elderly); military technologists (for monitoring dehydration in soldiers); athletes, trainers, or sports physicians/technicians (for testing dehydration in athletes "on-the-field" in practice or in competition); veterinarians (for testing dehydration in domestic pets, livestock, racehorses, or other animals.); farmers or agricultural scientists/engineers (for testing dehydration in plants and animals); environmental scientists (for testing the concentration of salt in water); and chemists, bioengineers, or chemical engineers (as a blueprint for building other disposable electronic-microfluidic hybrid devices in paper substrates).

In other embodiments, device 200 can be used in tissue engineering applications, for example in the generation of small "tissues". Catalytic chemistries, such as ELISA, can be incorporated into device 200 in order to make measurements of relatively small specimens. ELISA-type assays can be in the form of lateral flow or flow-through devices, where enzyme-labeled antibodies, for example, can be deposited into one or more hydrophilic channels 214, and then solvated by the biological fluid as it wicks through the channel. The labeled antibody can bind to an antigen in the sample, and this complex further bind to an antibody that is attached (covalently) or adhered (non-covalently) to at least one middle layer 204 of one or more hydrophilic channels 214. In one embodiment, at least one middle layer 204 may be treated with growth factors and/or growth modulators including but not limited to EGF, NGF, enzymes, etc. to help provide unique environments for generating tissues.

In still other embodiments, device 200 can be used in ophthalmology, e.g., in analyzing components in the vitreous fluid (the contents of the eye) or in tear films. Such analysis can be useful in diagnosing a variety of conditions (e.g., infections, tumors, trauma, response to systemic inflammation like rheumatoid arthritis). Eye fluids can be quickly analyzed, e.g., to determine the levels of antibodies and/or cytokines.

In other embodiments, device 200 can be used to measure components in bronchoalveolar lavage fluid to diagnose, e.g., aspiration from gastroesophageal reflux of stomach contents.

In one embodiment, device 200 can be used for detecting biochemical markers of metabolism, stress, and disease in plants, animals, and humans. In one embodiment, device 200 also can be used to detect pollution and other analytes in water and soil and are suitable for detecting analytes in other fluids like: cosmetics, oils, fuels, and others.

In some embodiments, device 200 can be used for breast milk analysis, e.g., to determine protein, fat, and glucose levels in the breast milk, which can help breast-feeding mothers adjust their feeds/pumping to capture adequate calories. This issue is particularly important to prematurely born babies, where nutrition is critical to catch-up growth.

In certain embodiments, device 200 may be used to detect a pathogenic or potentially pathogenic microbe. A pathogenic microbe can be a virus, a bacterium, and/or a fungus. In certain aspects, device 200 can be configured to detect a variety of microbes including viruses, bacteria, and fungi simultaneously. In certain aspects, a microbe includes a virus. The virus can be from the Adenoviridae, Coronaviridae, Filoviridae, Flaviviridae, Hepadnaviridae, Herpesviridae, Orthomyxoviridae, Paramyxovirinae, Pneumovirinae, Picornaviridae, Poxyiridae, Retroviridae, or Togaviridae family of viruses; and/or Parainfluenza, Influenza, H5N1, Marburg, Ebola, Severe acute respiratory syndrome coronavirus, Yellow fever virus, Human respiratory syncytial virus, Hantavirus, or Vaccinia virus.

In yet another aspect, the pathogenic or potentially pathogenic microbe can be a bacteria. A bacterium can be an intracellular, a gram positive, or a gram-negative bacteria. In a further aspect, bacteria include, but is not limited to a *Neisseria meningitidis* (*N. meningitidis*), *Streptococcus*

*pneumoniae* (*S. pneumoniae*), and *Haemophilus influenzae* type B (Hib), *B. pertussis, B. parapertussis, B. holmesii, Escherichia*, a *Staphylococcus*, a *Bacillus*, a *Francisella*, or a *Yersinia* bacteria. In still a further aspect, the bacteria is *Bacillus anthracis, Yersinia pestis, Francisella tularensis, Pseudomonas aerugenosa,* or *Staphylococcus aureas*. In still a further aspect, a bacteria is a drug resistant bacteria, such as a multiple drug resistant *Staphylococcus aureas* (MRSA). Representative medically relevant Gram-negative bacilli include *Hemophilus influenzae, Klebsiella pneumoniae, Legionella pneumophila, Pseudomonas aeruginosa, Escherichia coli, Proteus mirabilis, Enterobacter cloacae, Serratia marcescens, Helicobacter pylori, Salmonella enteritidis,* and *Salmonella typhi*. Representative gram-positive bacteria include, but are not limited to *Bacillus, Listeria, Staphylococcus, Streptococcus, Enterococcus, Actinobacteria* and *Clostridium Mycoplasma* that lack cell walls and cannot be Gram stained, including those bacteria that are derived from such forms.

In still another aspect, the pathogenic or potentially pathogenic microbe is a fungus, such as members of the family *Aspergillus, Candida, Crytpococus, Histoplasma, Coccidioides, Blastomyces, Pneumocystis,* or *Zygomyces*. In still further embodiments a fungus includes, but is not limited to *Aspergillus fumigatus, Candida albicans, Cryptococcus neoformans, Histoplasma capsulatum, Coccidioides immitis,* or *Pneumocystis carinii*. The family zygomycetes includes Basidiobolales (Basidiobolaceae), Dimargaritales (Dimargaritaceae), Endogonales (Endogonaceae), Entomophthorales (Ancylistaceae, Completoriaceae, Entomophthoraceae, Meristacraceae, Neozygitaceae), Kickxellales (Kickxellaceae), Mortierellales (Mortierellaceae), Mucorales, and Zoopagales.

In certain embodiments device 200 may be configured for diagnosis in a laboratory or home setting. In other embodiments device 200 may be configured to provide a point of care device for field diagnosis. Furthermore, the device and method presented may be used to detect various plant, animal, food-borne, and other infectious diseases (e.g., *B. pertussis*, HIV) in resource-limited settings.

In some embodiment, device 200 may be used for culturing a variety of cells and may provide important three-dimensional structure to impart desirable characteristics to the cultured cells. In one embodiment, any type or combination of types of cells (including but not limited to liver cells, stem cells, iPSCs (induced Pluripotent Stem Cells, kidney cells, cardiac cells, neuronal or glial cells, or etc.) may be cultured.

In some embodiment, device 200 may be used for analysis of chemotactic movements of specific cell types including but not limited to lymphocytes, neutrophils, other types of immune cells towards drug molecules, chemicals, chemokines, cytokines, etc. In one embodiment, device 200 may be used for drug testing and receptor binding assays. In one embodiment, device 200 may be used for biosensing or chemo sensing of the biological molecules such as blood glucose. In one embodiment, device 200 may be used for low-cost biosensing applications for the detection of disease specific biomarkers such as lactate, uric acid, glucose ions and/or salt concentrations. In one embodiment, device 200 may be used for the detection of infectious diseases such as COVID-19, seasonal flu, tuberculosis, typhoid, dengue, malaria etc. In one embodiment, device 200 may be used for detection of and non-communicable diseases including but not limited to obesity, diabetes, cardiovascular disorders, hypertension, cancer, etc. by detecting specific biomarkers in the body fluids (blood, urine, tears, saliva). In one embodiment, device 200 may be used for allergen detection. In one embodiment, device 200 can be used for analyzing histamine release from immune cells.

In some embodiment, device 200 may be used as a solid support for different types of nucleic acids (including but not limited to RNA, DNA, cDNA, tumor DNA, fetal DNA, circulating DNA, mRNA, miRNA) extraction. In one embodiment, device 200 may be used for developing nucleic acid-based and protein-based diagnostics for pathogen detection including viruses, bacteria, fungi, algae, and parasites (e.g., Malarial parasites, Trypanosomes, Coccidia, etc.). In one embodiment, device 200 may be used for developing high through-put PCR and protein arrays.

In some embodiments, device 200 may be used for culturing 3D spheroid cell cultures or organoids cultures. In one embodiment, surface modification may be used on device 200 with substances including but not limited to chitosan for culturing 3D spheroid cell cultures or organoids cultures. In one embodiment, the cultured spheroid or organoid may be developed as disease models of cancer or neurodegenerative diseases. In one embodiment, the cultured spheroid or organoid may be used for modelling most types of diseases with cellular or tissue pathology. In one embodiment, the device with cells or tissues can be develop as disease-in-a chip models.

In some embodiment, device 200 may be embedded with electronics, electronic components, and/or interconnects for electrical cues and/or electrical signal transduction to cells, tissue, and organ on chip.

In one embodiment, one or more middle layer 204 may further comprise drug molecules. In one embodiment, the incorporated drug molecules may be used to impart desirable characteristics to the cultured cells. In one embodiment, the incorporated drug molecules may be used for interaction studies.

Furthermore, in one embodiment, device 200 may be fabricated by using a commercial laminator. A commercial laminator may be used for lamination, encapsulation, or protection of sheets. Commercial laminator may include a thermal laminator, pouch laminator, heated roll laminator, cold roll laminator, or the like. In another embodiment, a custom or specific rolling device that is similar in function to a commercial laminator may be used herein to fabricate the device. The rolling device may be customized for specific or range of temperatures, rolling speeds, and pressures, as per the need can be used. This rolling device may be specially designed for the use herein. Any other type of rolling device or laminator may be used herein to fabricate device 200.

EXPERIMENTAL EXAMPLES

The invention is further described in detail by reference to the following experimental examples. These examples are provided for purposes of illustration only and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples, therefore, specifically point out the preferred embodiments of the present invention and are not to be construed as limiting in any way the remainder of the disclosure.

Example 1: A Novel Process to Fabricate Paper-Based Microfluidic Devices Using Laminating Plastic Sheets Microfluidic paper-based analytical devices (microPADs) are emerging as simple-to-use, low-cost point-of-care testing platforms. An affordable and simple two-step process—Cut and Heat (CH-microPADs)—is presented for the fabrication of hydrophilic channels and reservoirs selectively on a wide variety of porous media such as tissue/printing/filter paper and cloth types such as cotton and polyester, by a lamination process. The devices possess excellent mechanical strength against bending and folding, making them virtually unbreakable. They showed good chemical resistance to various solvents, acids, and bases, presenting a widespread applicability in the areas such as clinical diagnostics, biological, sensing applications, food processing, and chemical industry. The fabricated 96 well-plate CH-microPADs were tested for cell culture applications using mice embryonic fibroblasts and detection of proteins and enzymes using ELISA. The technique presents a promising step towards mass fabrication of inexpensive disposable diagnostic devices both for resource-limited and developed regions.

The materials and methods employed in these experiments are now described.

Designing, Cutting and Fabrication of Paper Devices

The paper devices were designed in SolidWorks and exported to .dxf format. Adobe Illustrator was used to open/edit and as an interface to give print command to cut the devices. These device shapes were then cut using the multipurpose commercial laser cutter Epilog Laser Fusion 120 watts, used primarily for cutting and engraving of plastic and wood laminates. Laser power was used at 3 percent, and speed was used at 10 percent. These numbers were obtained after couple of iterations on plastic and paper sheets. Stationary purpose lamination sheets were used to create the hydrophobic barriers on various type of cloth sheets such as cotton, polyester and silk and paper sheets such as tissue paper, printing paper and filter paper. A6, A5 and A4 size lamination layers were used to cut the devices. The design can be cut in one or both the lamination layers depending on need and application. Different size lamination layers (brand name MODEST from Modern Stationery LLC) were sourced from Amazon UAE. The lamination layers can be of any other brand as well. The thickness of lamination layers (2 layers) was 250 µm. The filter paper sheet, a P8 grade (Fisherbrand) filter paper for the current studies or the paper sheet of interest was then placed in between cut lamination sheets, FIG. 2, forming a sandwich structure. The sandwich structures were then heated on a laboratory hot plate (IKA C-MAG HS 7), at different temperatures for varying durations.

Device Characterization: Microscope Imaging

The paper devices, lamination sheet and paper sheets were imaged using an optical microscope (Nikon Eclipse LV100NDA). The device cross-sections were imaged to visualize layered structure of lamination sheets with and without paper sheet before and after heating (FIG. 7A through FIG. 7D). The cross-sections were prepared by cutting the sheets using scissors. The images in FIG. 7D, FIG. 7E and FIG. 7F were obtained by mounting the cut cross-sections on a clamp and placing under the microscope objective. The clamp kept the cross-section pieces in stable position under the objective while imaging.

Device Characterization: SEM Imaging

Figure 8E:
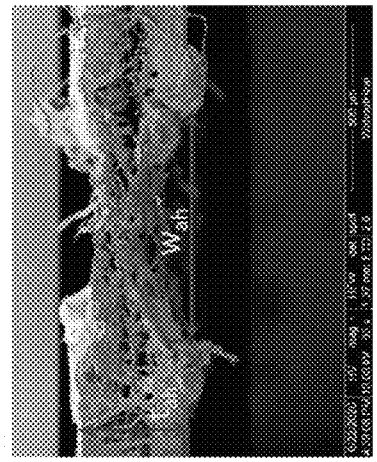
FIG. 8A through FIG. 8F depicts SEM image of paper sheet and CH-microPADs before and after heating.
Figure 8C:
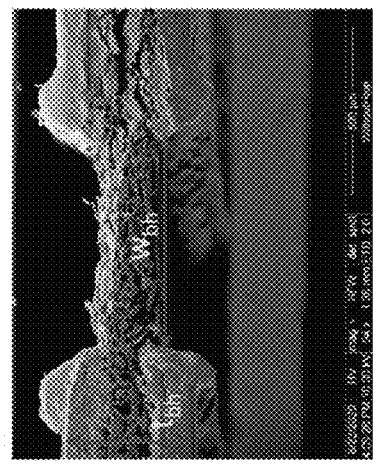
Figure 8A:
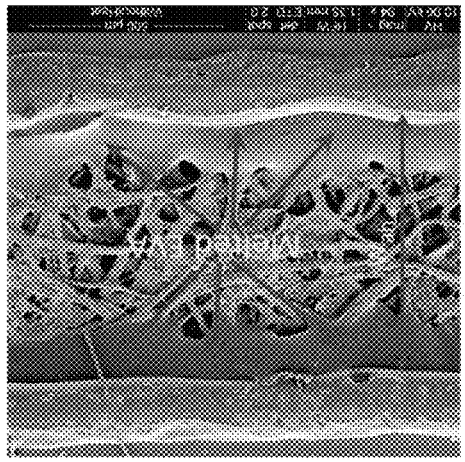
Figure 8F:
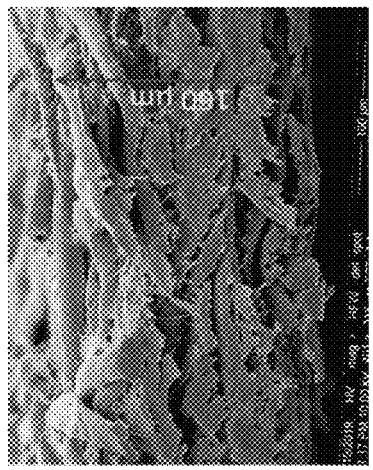

Surface and cross-sectional topography of filter paper sheet and fabricated devices was observed using scanning electron microscope (The Quanta 450 FEG, field emission scanning electron microscope (FE-SEM)) before and after heating the devices. 700±50 µm channel width devices were fabricated and imaged before (FIGS. 8C and 8D) and after heating (FIGS. 8E and 8F). The paper devices were coated with a thin 10 nm gold layer before imaging to increase the current conduction and reduce the charging effect.

Biological Assays: Cytocompatibility and Cell Viability

Mice embryonic fibroblasts (MEFs-ATCC® CRL-2752) at a concentration of $0.01 \times 10^6$ were cultured on the UV sterilized individual CH-microPADs placed inside the wells of 96 well plates for 24, 48 and 72 hours and stained with Calcein AM and Ethidium homodimer 1 (Invitrogen LIVE/DEAD™ Viability/Cytotoxicity Kit, for Mammalian Cells, L3224). Prior to staining, the cells were washed with pre-warmed physiological saline. The cells in the CH-microPADs were stained with 100 uL of 2M Calcein AM and 4M Ethidium homodimer 1 working solution for 45 minutes at room temperature. After the incubation, the CH-microPADs were lifted from the wells and mounted on a clean slide followed by confocal imaging using a Leica SP8 confocal laser scanning microscope. In this staining method, live cells are distinguished by the presence of ubiquitous intracellular esterase activity, determined by the enzymatic conversion of the virtually nonfluorescent cell-permeant Calcein AM to the intensely fluorescent Calcein. The polyanionic dye Calcein is well retained within live cells, producing an intense uniform green fluorescence in live cells. Ethidium homodimer 1 dye enters cells with damaged membranes and undergoes a 40-fold enhancement of fluorescence upon binding to nucleic acids, thereby producing a bright red fluorescence in dead cells. The results of the assay is displayed in FIG. 11A.

MTT Assay for Cell Proliferation

Figure 11B:
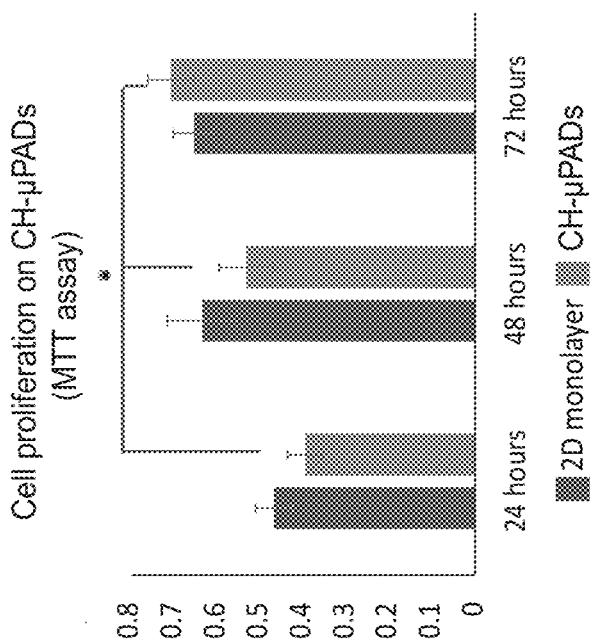
FIG. 11A through FIG. 11B depicts cell compatibility and proliferation on CH-microPADs. The CH-microPADs showed excellent biocompatibility characteristics while culturing the mouse embryonic fibroblasts (MEFs) in 96 well format culture vessels. The cell viability and proliferation were analyzed by live-dead staining and MTT assay at hours 24, 48 and 72.

The MTT assay was used to test for cell proliferation on the CH-microPADs. MEFs cultured on wells as monolayers were used as the control. The mechanism of this assay is based on metabolically active cells reducing the tetrazolium salt of MTT (3-(4,5-Dimethylthiazol-2-yl)-2,5-diphenyltetrazolium bromidefor) to purple formazan (MTT cell proliferation kit, catalogue number 21465007001, Roche). The CH-microPADs with thickness of 120 µm and diameter of 6 mm were placed in each well of 96 well plate inside a biosafety cabinet. The scaffolds were sterilized under UV radiation for one hour each on both sides. MEFs at a concentration of $0.01 \times 206$ cells/well were plated on to the CH-microPADs placed in each well. The plates were incubated at 37° C. with 5% $CO_2$ for one hour. After the incubation, 100 uL of DMEM containing 10% fetal bovine serum (FBS) and 1× antibiotics (Sigma) were added to each well and incubated at 37° C. with 5% $CO_2$ for three time points, 24 hours, 48 hours, and 72 hours. At each time points, 10 µl MTT labelling solution was added to each well followed by incubation for 4 hours. After 4 hours, 100 uL MTT solubilization reagent was added to each well and incubated overnight. Media without cells and with the CH-microPADs were used as blank. 2D monolayer MEF culture was used as a cell growth control. 100 µL aliquots from cultures wells were transferred to another 96-well plate for measuring Absorbance. Absorbance was measured at a wavelength of 570 nm using a microplate reader (Epoch, BioTek). All steps in MTT assays were conducted in dark as MTT reagents are sensitive to light. The results of the assay are depicted in FIG. 11B.

Immuno-Detection Assays

A direct ELISA was carried to test the immuno-detection ability of the fabricated CH-microPADs in 96 well format. IgG from rabbit serum, anti-rabbit IgG antibody produced in goat (goat anti-rabbit IgG), anti-rabbit IgG-alkaline phosphatase conjugate (goat anti-rabbit IgG-ALP), and 5-bromo-4-chloro-3-indolyl-phosphate/nitroblue tetrazolium (BCIP/NBT) liquid substrate system was purchased from Sigma-Aldrich. Phosphate buffered saline (PBS) was obtained from Thermo Fisher Scientific. All reagents were used as received and sterile nuclease free water was used throughout the experiments. For detecting the dilution linearity of ELISA reaction, rabbit IgG concentrations ranging from 0.01 μg/mL-1000 μg/mL were used. Rabbit IgG concentration which showed the most linear reaction kinetics was used for the actual ELISA experiments. The concentration ranging from 1 μg/mL to 100 μg/mL was coated onto the each well of the CH-microPADs in serial dilution and incubated 12 hours at 4° C. After incubation, the coated CH-microPAD wells were blocked with 1% BSA in PBS for one hour at room temperature, then washed with PBS and added goat anti-rabbit IgG-Alkaline phosphatase conjugate in 1:200 dilution for one hour at room temperature. The enzymatic reactions were developed with the NBT-BCIP substrate for 15 minutes at room temperature (Soman, S. S. et al., 2009, Molecular Immunology, 46(10):2029-2038; Liu, S. et al., 2019, Chemical, 285:529-535). All fluid volumes used are 10 μL per well. For quantifying the color development, the CH-microPADs were analyzed in a BioTek microplate reader at Absorbance 570 nm. A graph was plotted based on mean color intensity after subtracting the blank well values. An iPhone camera was used to capture the images of colorimetric assays as viewed by the eyes. Ricoh scanner was used to scan the color developed on CH-microPADs at a resolution of 300 dpi after removing the liquid. The results of the immunoassay are showed in FIG. 12A through FIG. 12D. The experiments were carried out at least three times in triplicates and analyzed statistically.

The results of these experiments are now described.

Fabrication of Paper Devices

Figure 6D:
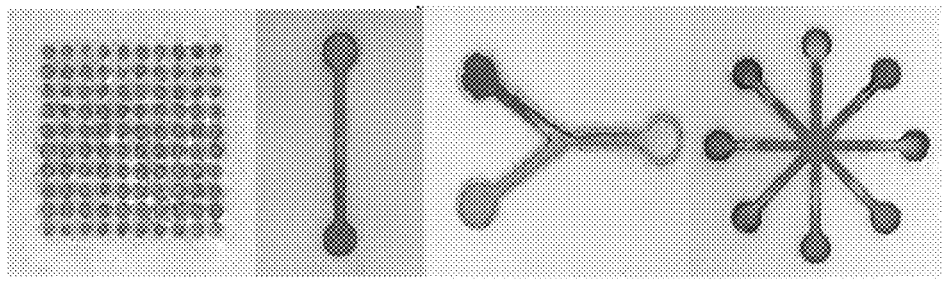
FIG. 6A through FIG. 6D depicts the fabrication of cut and heat microPADs or CH-microPADs.
Figure 6A:
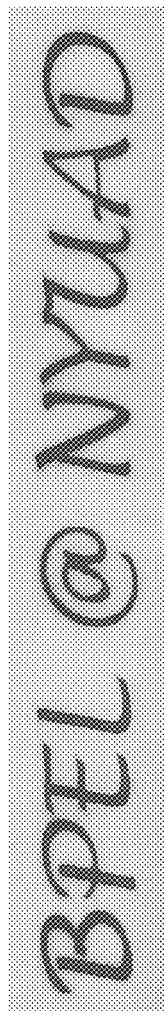

The CH-microPADs fabrication is a simple two-step process. In the first step, the devices were cut in specific design in the lamination sheets and in the second step, heated on a hot plate with a sheet of paper in between two lamination sheets having cut channels. For the device fabrication, the devices were designed in the CAD software as per the need of the experiments in line, Y, circular array, flower shape and 96 well plate format and cut using a laser cutter in the lamination layers. The filter paper sheet was then placed in between cut lamination layers, (FIG. 2), forming a sandwich structure. The sandwich structures were then heated on a laboratory hot plate. When the heating was done, the ethylene vinyl acetate (EVA) layer on the lamination sheets slowly melted and diffused in the paper sheet from the top and the bottom layer, shown schematically in (FIG. 7A through FIG. 7F. The diffused EVA created hydrophobic barriers and leaving cut areas as hydrophilic channels and sample/reaction spaces. Using the process described the letters (BPEL @NYUAD) were cut in the lamination sheets and used for patterning of hydrophilic and hydrophobic areas using a filter paper sheet. The patterned letters were used as hydrophilic regions to flow Rhodamine B (that gives the pinkish color) as an analyte (FIG. 6A). The hydrophobic boundaries were strong enough that the letters are sharp (FIG. 6A), without any visible leak or blot at the ends.

Figure 6C:
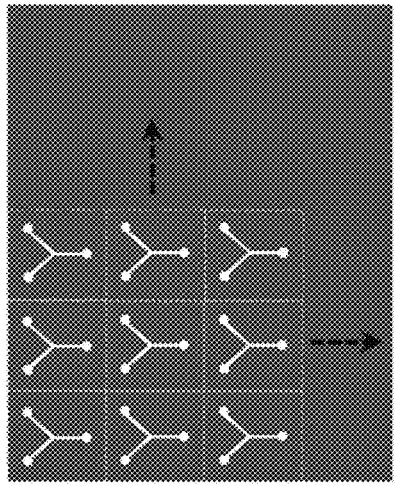

The device designs can be cut in large numbers in A2, A3, A4 or A5 lamination layers and then heated on a hot plate either one sheet at a time or in a stacked fashion. The individual microPADs then can be cut and used as needed from the mass fabricated array of CH-microPADs (FIG. 6C). The proposed technique was used for the fabrication of different device designs such as 96 well plate (FIG. 6B), circular array, line, Y, and flower shape (FIG. 6D). The line, Y and flower shape devices were shown for the mixing of red and green colors to generate yellow color. These device designs can be used for various sensing and quality control applications based on mixing of analytes or reaction of analytes with the cells seeded in the hydrophilic inlet reservoirs. In the current study, fabricated 96 well plates were used for cell culture applications and detection of proteins and enzymes using ELISA in the hydrophilic 3D porous paper matrix.

Material Used to Create Hydrophobic Barriers

Stationary purpose lamination sheets were used to create the hydrophobic barriers on various type of cloth sheets such as cotton, polyester, silk and paper sheets such as tissue paper, printing paper and filter paper. The commercially available lamination sheets are inexpensive and readily available from local stationary or online stores. The lamination layers are made of polyethylene terephthalate (PET) outer layer and EVA inner layer (Anni, M., 2012, Applied Physics Letters, 101(1):013303) (FIG. 7A through FIG. 7F). EVA is a block-copolymer made by combining ethylene and vinyl acetate. EVA melting temperatures vary between 90° C. to 120° C. depending on the ratio of vinyl acetate and ethylene (Crawford, R. J. et al., 2002, William Andrew Publishing: Norwich, NY. p. 19-68). EVA copolymers are commonly used as hot-melt adhesives for various applications such as footwear, furniture, packaging, product assembly, bookbinding and heat-sealing applications (Lu, X. et al., 2017, RSC Advances, 7(58):36382-36391; Park, Y. J. et al., 2006, International Journal of Adhesion and Adhesives, 26(8):571-576).

Figure 7A:
FIG. 7A through FIG. 7F depicts diffusion of EVA, a hot melt adhesive, in the paper sheets while heating on a hot plate.
Figure 7B:
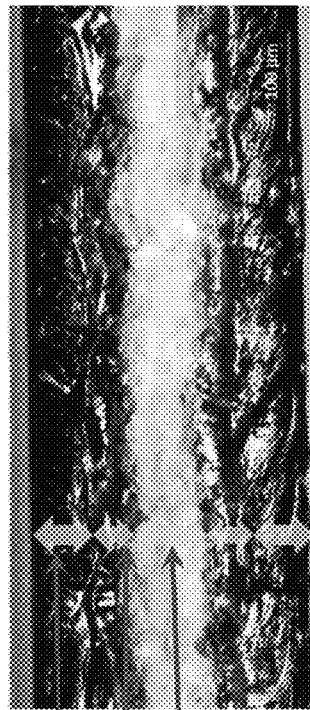
Figure 7C:
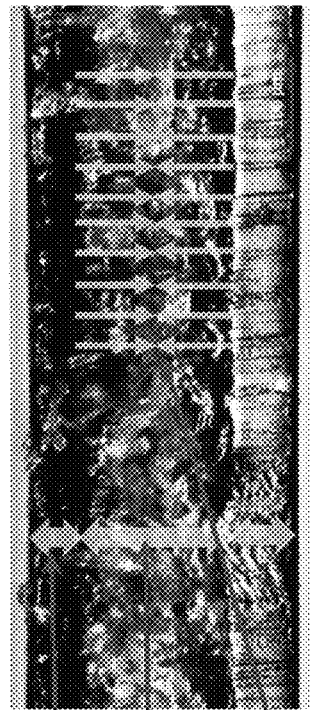
Figure 7D:
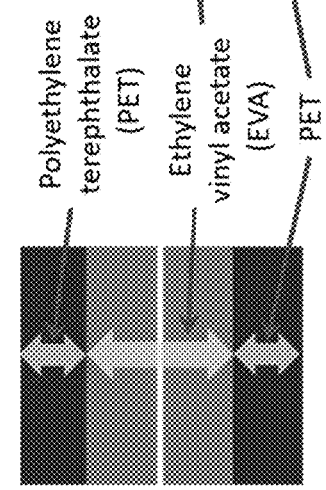
Figure 7E:
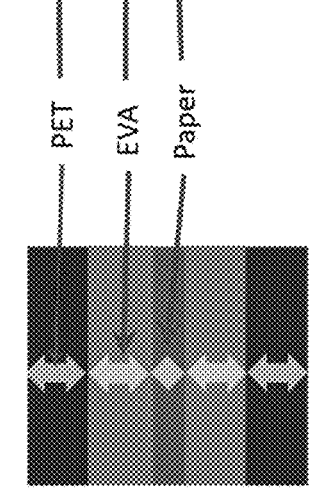
Figure 7F:
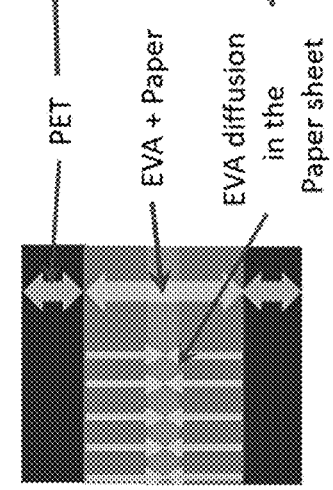

The microscope image of the cross-section of a lamination layer clearly highlighted the layered structure, PET and EVA, (FIG. 7D). A filter paper placed between two lamination sheets and heated for 20 seconds at 160° C. is imaged (FIG. 7E). It can be observed that within 20 seconds the EVA layer started melting and diffusing in the paper sheet, which in turn made firm contact with the paper sheet. After heating for 20 seconds at 160° C. the thickness of layered assembly was approximately 360 μm (FIG. 7E). As the filter paper sandwiched lamination sheets were heated for 35 minutes at 160° C., the EVA layer diffused completely in the paper layer, changing the color from white to charcoal grey, matching with the color of EVA layer (FIG. 7F). It can be observed from FIG. 7F, the thickness of layered assembly reduced to 310 μm as compared to 360 μm in FIG. 7E. The reduction in the thickness was due to slow diffusion of EVA layer in the porous filter paper as it was continually heated at 160° C.

SEM Imaging of Paper and Fabricated Devices

Figure 8D:
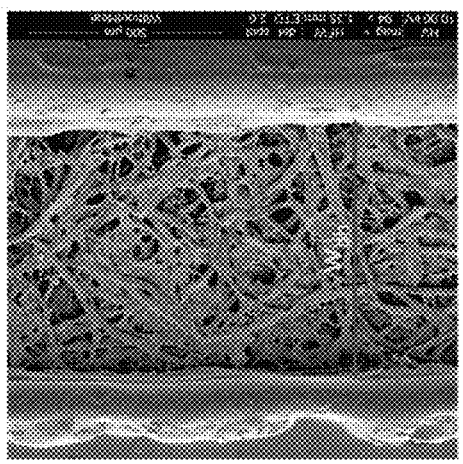
Figure 8B:
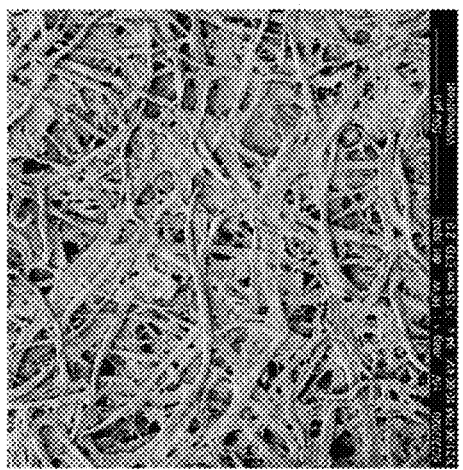

Surface and cross-sectional topography of filter paper sheet and fabricated devices was observed using scanning electron microscope (SEM) before and after heating the devices. For the device fabrication, P8 grade filter paper (Fisherbrand) sheets were used, SEM image of the surface and cross-sectional view of the paper sheet is shown in FIG. 8A and FIG. 8B. The paper sheet is made of multiple layers of cellulose fibers and the thickness of the paper sheet was approximately 160 micrometers (μm), (FIG. 8B). The paper sheet was placed between two lamination sheets having a channel of width 700±50 μm heated for 20 seconds at 160° C. The short 20 s heating was to hold it properly for imaging purpose only so that the paper sheet made good contact with the lamination sheets and did not move while handling the device. The channel top view and cross-section after 20 s heating is shown in FIG. 8C and FIG. 8D. The device was then heated at 160° Celsius for 35 minutes. With heating, the EVA diffused in the paper sheet in the vertical direction and also in the channel area laterally (FIG. 8E and FIG. 8F). On heating, the sandwiched area became hydrophobic because of the diffusion of melted EVA in the paper sheet and open paper areas remained hydrophilic for the flow of analytes.

Optical Microscope Imaging of Fabricated Devices

The inner layer of the lamination sheets is made of EVA whereas outer layer is made of PET. These sandwiched structures were imaged under the microscope before and after heat treatment (FIG. 9A through FIG. 9I). A 700±50 micrometers (μm) width channel was cut in the lamination sheets and a P8 grade (Fisherbrand) filter paper sheet was placed in between them (FIG. 9A). The cross-sectional view of the device is shown in FIG. 9B, FIG. 9D and FIG. 9F highlighting open paper region, which will be hydrophilic and sandwiched paper region between lamination sheets, which will become hydrophobic after heating the device structure (FIGS. 9D and 9F). The device structure was then heated on a hot plate for 35 minutes at 160° Celsius. When heated at a temperature of 160° Celsius, the EVA layer in contact with paper sheet, slowly melted and diffused in the paper sheet. After heating, the sandwiched areas were seen brighter under the microscope compared to before heating; this is because when EVA is diffused in the paper sheet, pores and blank area in between fibers were filled with EVA causing less light scattering and absorbing by paper sheet (FIG. 9C). The cross-sectional view of the device structure after heating highlights that the color of paper sheet turned to charcoal grey from white as EVA layer diffused in the paper sheet on heating (FIG. 9D). The sandwiched paper regions turns to hydrophobic region due to the diffused EVA and created sharp boundaries from open hydrophilic paper region for confinement of liquids. When the hydrophilic paper region in the device was introduced with 5 microliters of red food color, it showed clear boundary between color paper region to hydrophobic sandwiched region (FIG. 9E). The cross-sectional view of the device structure with food color is shown in FIG. 9F. The EVA layer, when melted, diffused isotropically in the paper sheet both in the vertical and lateral directions, forcing it into the hydrophilic paper channel, as shown with dashed yellow lines in FIG. 9A through FIG. 9F. The isotropic flow of EVA on heating reduced the effective channel width from 700±50 μm ($W_{bh}$) to 600±50 μm ($W_{ah}$) (FIG. 9C and FIG. 9E respectively).

The present technique overcomes difficulties faced by wax patterning to create hydrophobic barriers. The main limitation of wax-based pattering was in achieving control on the flow of the melted wax while creating barriers into the porous paper media (Carrilho, E. et al. 2009, Analytical Chemistry, 81(16):7091-7095). Here, the present technique offers a simple two-step process having precise control to form hydrophobic barriers in which sandwiched regions became hydrophobic on heating whereas open areas were left hydrophilic. Another advantage is the very high thermal stability up to 100° C. offered by these devices. This is because the EVA diffusion process only starts at temperatures more than 110° C. and it takes more than 12 hours even at 110° C. for the EVA to completely diffuse in the paper sheets. Therefore, the proposed CH-microPADS are ideally suited for high temperature analyte measurements as well.

The heating duration at a specific temperature is a very important parameter for uniform diffusion of EVA inside the paper sheets. The EVA needs to be diffused completely while heating through the paper sheet in order to make it completely hydrophobic. If the heating is uneven and for shorter duration, the EVA diffusion will not be uniform, leaving hydrophilic parts in the sandwiched area. Three devices were tested to study the effect of heating duration on liquid confinement; the devices were heated at 160° C. for three different time durations. For the testing, 1 mm channel devices having a 2 mm diameter test area were fabricated. In each device, 5 microliters of food color were introduced to see its spread. The liquid confinement was different for all three devices as shown in the picture of the devices with the inset showing zoomed area shown under the microscope (FIG. 9G through FIG. 9I). Device 1 was heated for 20 minutes at 160° C., it can be observed that the dye leaked and spread out of the channel, making effective width of the channel more than 1 mm (FIG. 9G). Device 2 was heated for 35 minutes at 160° C., the food color remained confined within the channel width, the effective channel width was 1±0.05 mm measured under the microscope FIG. 9H). The third device was heated for 60 minutes at 160° C. With overheating, the EVA diffused deeper in the channel area resulting in a narrower channel, a reduced channel width from 1 mm to 0.750±0.05 mm (FIG. 9I). Therefore, the heating at 160° C. for a duration of 35 minutes was found optimal; it resulted in leak-proof channels with sharp boundaries between the hydrophobic and hydrophilic areas. For the same heating temperature, the duration may be reduced if the pressure is increased.

Lower the temperature, longer would be the heating duration for optimal EVA diffusion in the porous sheet and vise-versa. In order to optimize the heating temperature and duration, the sandwich structures were heated at various temperatures such as 110° C., 120° C., 140° C., 160° C., 180° C. and 200° C. for different durations. It took 12 hours, 3 hours, 1 hour, 35 minutes, 15 minutes, and 5 minutes respectively to completely diffuse EVA through qualitative grade plain filter paper sheet-P8 grade (Fisherbrand). When different porous media such as cloth or other types of papers are used, the temperature vs time duration has to be optimized. The heating process showed an inverse relationship with heating duration (FIG. 9J). The process can be multiplexed by heating multiple device structures arranged in a stack.

Minimum Channel Width and Stability of CH-microPADs Against Various Chemicals

Figures 10A, 10B, 10C, 10D:
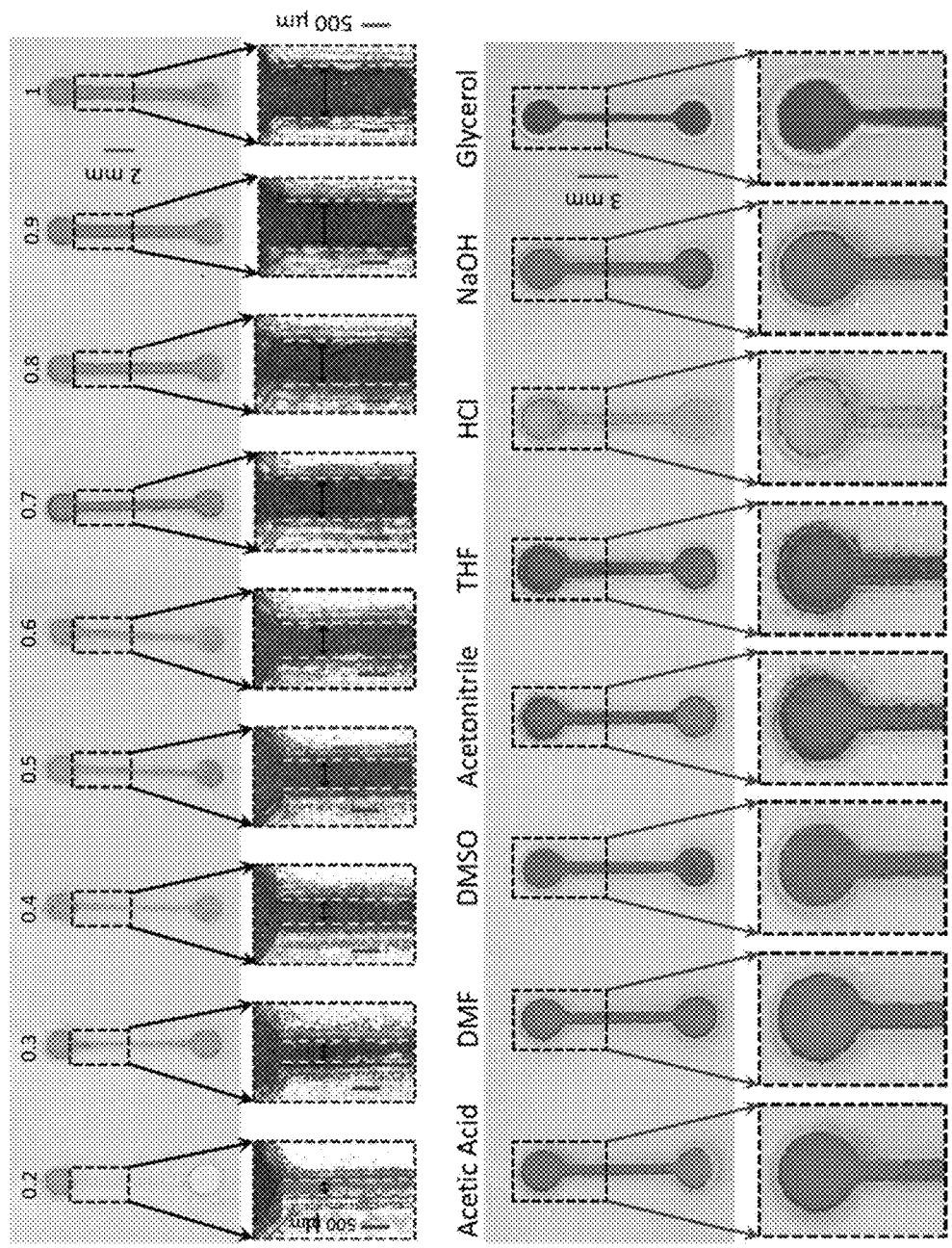
FIG. 10A through FIG. 10D depicts the resolution of the CH-microPADs and chemical stability.

Channels of different widths ranging from 0.2 mm to 1 mm were fabricated to determine the minimum channel width of CH-microPADs. The channels were 10 mm in length with a 2 mm diameter reservoir at both ends (FIG. 10A). The sandwiched structures were heated at 160° C. for 35 minutes on a hot plate. In each device, 5 microliters of food color was introduced. All the devices showed flow of food color from one end to the other end, except for the 0.2 mm device. The channel widths were measured under the microscope (FIG. 10B) shown as inset in (FIG. 10A). A minimum channel width of 0.3±0.05 mm was obtained for the CH-microPADs with repeated devices (n=10).

In order to evaluate the chemical stability, the CH-microPADs were exposed to several chemicals such as acids, bases, and solvents. For the testing, 1 mm wide and 10 mm long channels with 3 mm diameter reservoir at both ends were fabricated (FIG. 10C). The EVA formed barriers were stable against most of the chemicals such as acetic acid, dimethylformamide (DMF), dimethyl sulfoxide (DMSO), hydrochloric acid (HCl), sodium hydroxide (NaOH) and glycerol. The chemicals were mixed with red food color dissolved in water and introduced in the channel reservoir shown in FIG. 10C. The concentration of HCl and NaOH was 1M and the other chemicals were undiluted except glycerol (diluted at a ratio of 1:5 with deionized water). The acetonitrile and tetrahydrofuran (THF) showed some leakage at the introduction reservoir (FIG. 10D). It was interesting to note that the barriers were resistant to most of the chemicals used including strong acids and bases. The CH-microPADs showed good chemical resistance to various solvents, acids, and bases, showing strong compatibility of devices for a variety of solvents and analytes.

Biological Assays on CH-microPADs: Cytocompatibility and Cell Viability Assays

Figure 11A:
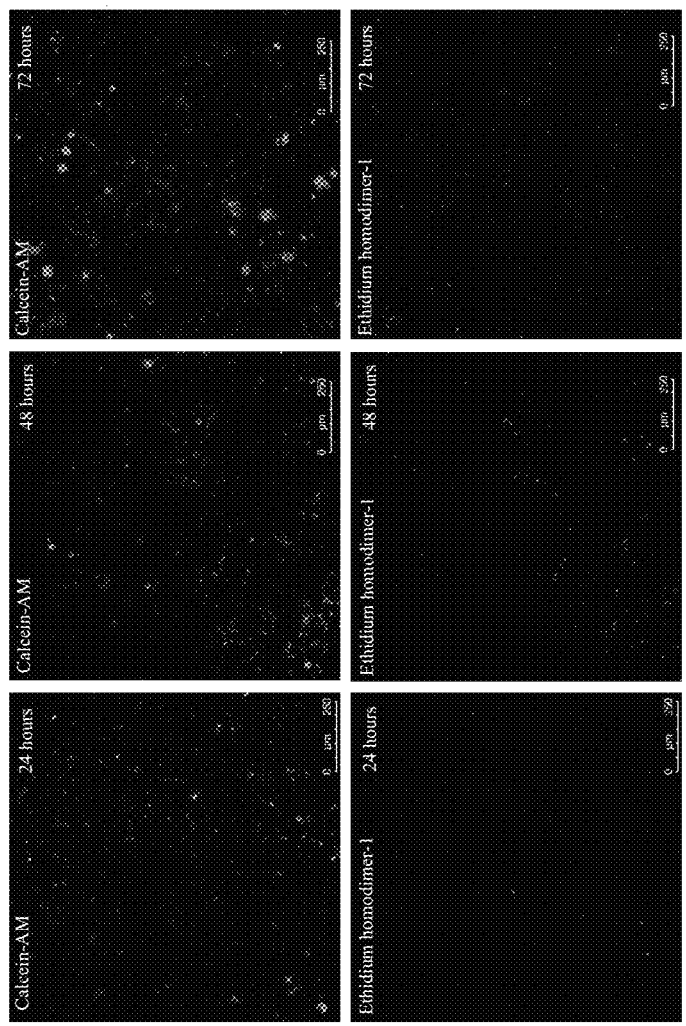

To evaluate the cytocompatibility and viability, mice embryonic fibroblasts (MEFs) were cultured on sterile CH-microPADs cut in the shape and dimensions of a traditional 96 well plate (FIG. 6A). The cell viability and growth were analyzed at 24, 48 and 72 hours. The CH-microPADs with cells and without cells were stained with live-dead assay reagents and imaged in a confocal microscope and assessed using ImageJ software. FIG. 11A shows the growth of MEF colonies on the CH-microPADs. The stained cells on CH-microPADs showed remarkably enlarged green fluorescing colony formation by 72 hours compared to 24 hours culture, while the red florescence intensity of cells was less compared to the green as observed at 72 hours, indicating cell compatibility, viability, and growth on the CH-microPADs.

MTT Assay for Proliferation

The MTT (2,5-diphenyl-2H-tetrazolium bromide) assay was used to test the metabolic activity of cells on the CH-microPADs. The cell metabolic activity indicated the proliferation of cells at different time points of 24, 48 and 72 hours. The MTT assay showed highly significant (*$P<0.00001$) cell proliferation in 48 hours and 72 hours compared to 24 hours. At 72 hours, the MEF (mouse embryonic fibroblasts) proliferation in the CH-microPADs exceeded that in the 2D monolayer culture, clearly indicating its potential use as a preferable material for 3D cell culture. The data showed here represent mean and standard deviation of three independent experiments in triplicate. The data were analyzed using two tailed student's t test compared to the controls and the p values were calculated (FIG. 11B).

Figure 6B:
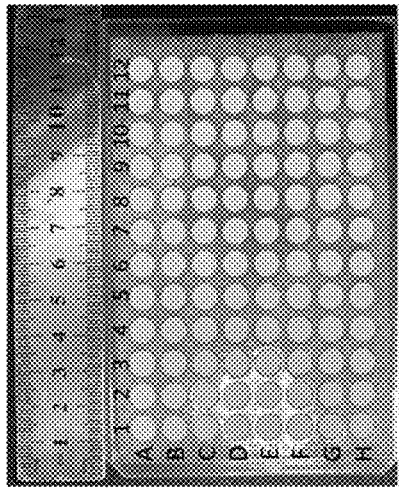

ELISA (Enzyme-Linked Immunosorbent Assay) Based Immuno-Detection Assay on CH-microPADs Here, a proof-of-concept design of enzyme based immuno-detection using the fabricated CH-microPAD devices (in 94 well plate format as shown in FIG. 6B) was described. Rabbit IgG in serial dilution was coated onto each well of the CH-microPADs and detected using goat anti-rabbit IgG-Alkaline phosphatase conjugate. The enzymatic reaction of the antibody conjugated Alkaline phosphatase was developed with the nitro blue tetrazolium (NBT)-5-bromo-4-chloro-3-indolyl phosphate (BCIP) substrate. The enzymatic reaction observed was directly proportional to the concentration of the rabbit IgG coated onto the wells. The wells coated with 100 µg/mL rabbit IgG showed maximum color development while the lower concentrations IgG coated wells showed less intense color in a serial manner. FIG. 12A through FIG. 12D shows the assay scheme and the result of the enzymatic immune-detection on CH-microPADs. The color development was clearly distinct in the same manner with human eyes, under camera, in a scanner and in quantification using spectrophotometry.

The microPADs are lightweight, disposable, low-cost, simple fabrication and ease of operation point of care devices. They enable fluid transport via capillary action without the need of external pumps and power supply as compared to microfluidic devices made with glass, silicon and/or polymers because of their hydrophilic and porous nature. Many techniques have been demonstrated for the patterning of paper sheets based on ink jet printing (Abe, K. et al., 2008, Analytical Chemistry, 80(18):6928-6934; Abe, K. et al., 2010, Bioanalytical Chemistry, 398(2):885-893), screen-printing (Dungchai, W. et al, 2011, Analyst, 136(1): 77-82), photolithography (Martinez, A. W. et al., 2007, Angewandte Chemie International Edition, 46(8):1318-1320; Martinez, A. W. et al., 2008, Proceedings of the National Academy of Sciences, 105(50):19606; Klasner, S. A. et al., 2010, Analytical and Bioanalytical Chemistry, 397(5):1821-1829), plasma treatment (Li, X. et al., 2008, Analytical Chemistry, 80(23):9131-9134), CVD (Lam, T. et al. 2017, Scientific Reports, 7(1):1188), wax printing (Carrilho, E. et al., 2009, Analytical Chemistry, 81(16):7091-7095; Lu, Y. et al., 2010, Analytical Chemistry, 82(1):329-335), flexographic printing (Olkkonen, J. et al., 2010, Analytical Chemistry, 82(24):20246-20250), laser treatment (Chitnis, G. et al., 2011, Lab on a Chip, 11(6):1161-1165) and techniques based on automated/hand held tools (de Tarso Garcia, P. et al., 2014, RSC Advances, 4(71):37637-37644; Fenton, E. M. et al., 2009, ACS Applied Materials & Interfaces, 1(1):124-129; Wang, W. et al., 2010, Journal of Chromatography A, 1217(24):3896-3899; Bruzewicz, D. A. et al., 2008, Analytical Chemistry, 80(9):3387-3392; Ghaderinezhad, F. et al., 2017, Scientific Reports, 7(1):3553). Even after 14 years since their first introduction in 2007, the successful commercialization and scale-up of microPADs is far from reality. That is primarily because of challenges associated with many of these techniques for the automated mass fabrication of microPADs. Wax printing is commonly used for the patterning of channel barriers on a paper sheet, however wax printers are not commonly available. Patterning with wax also poses challenges related to flow control and leakage problem with surfactant mixed biological samples (Li, X. et al., 2012, Biomicrofluidics, 6(1):11301-1130113). While techniques such as CVD, photolithography and plasma treatment provide good reproducibility and precision, they involve complex processing steps to be carried in specific laboratory conditions which in turn increase the cost of the microPAD devices (Ghosh, R. et al., 2019, Scientific Reports, 9(1):7896). The microPADs fabricated by the techniques mentioned above also lack good mechanical robustness as compared to conventional microfluidic devices made from polymers, glass and/or silicon (Yang, Y. et al., 2017, Analytical Chemistry, 89(1):71-91). A promising technique for practical applications in both resource-limited settings and developed places should be suitable for mass fabrication with minimal fabrication steps, low cost, good mechanical strength and high precision and reproducibility.

In this study, an affordable, simple, and easily accessible technique is developed for rapid fabrication of low-cost microPADs. It is a simple two-step process for the fabrication of hydrophilic channels and reservoirs selectively on a porous sheet. The process can be used to create hydrophobic barriers on a wide variety of porous media such as tissue paper, printing paper, filter paper and a wide variety of cloth types such as cotton, silk and polyester. MicroPADs were fabricated only by using lamination layers and filter paper or a porous media of interest as consumable material. The fabrication process can be used to create any device designs or fluidic patterns on the porous sheets. This makes the process robust and repeatable every time, unlike many other techniques used to fabricate microPADs where repeatability is a major concern. The fabrication steps involve minimal human intervention, making the process ideal for automation, which is a key feature, aimed at mass fabrication of CH-microPADs. The fabrication process was characterized and demonstrated by creating different device designs on various types of paper and cloth sheets. The presented technique circumvents the use of clean room facilities and harsh chemicals making it easily accessible for point of use fabrication of microPADs. The fabricated devices are highly robust, thermally and chemically stable for a wide range of solvents, strong acids and bases. Moreover, the devices possess very high mechanical strength against bending, folding and tearing. The fabricated devices were virtually unbreakable as the devices are fabricated through lamination process commonly used for the protection of paper sheets.

In vitro biocompatibility and cell proliferation assays using MEFs on fabricated CH-microPADs showed good cytocompatibility and cell proliferation. Cell-incorporated CH-microPADs can be developed into an easily maintainable 3D cell culture system to use in tissue transplants such as skin patches in burn injuries and wound care (Atkin, L. et al., 2019, British Journal of Community Nursing, 24(Sup9): S26-S32). The cellulose material used to make the CH-microPADs are biocompatible, nontoxic and environment friendly.

Also, different growth modulators, silver nanoparticles and drug molecules can be incorporated in the CH-microPADs along with the cellular components to translate this research into clinical application. The protein adsorption capacity of the fabricated CH-microPADs appeared consistent in the ELISA experiments. The reagents required to do the assay is 5-10 µL in each step, which saves the amount of costly immuno-detection reagents compared to the traditional 96 well plate plastics. This observation expands its scope to be used as an immunodiagnostic device. The current paper based immuno-detection devices are mostly limited to test strip-based applications. But, amidst global pandemic crisis such as Covid-19, it is essential to develop efficient and cheaper mass diagnostic devices. The 96 or 384 well format CH-microPAD devices would be useful to bring in huge improvements in the immunoassay throughputs at mass point-of-care testing units. The proposed CH-microPAD devices are cheaper to produce, can be stored in less space at room temperature, can reduce the use of expensive immune reagents and polluting plastic materials per immunoassay.

In summary, a simple, low-cost, and robust rapid prototyping technique is demonstrated for the fabrication of CH-microPAD devices for biological and healthcare applications. The process is scalable and involves minimal human intervention making it ideal for automation, where multiple devices can be fabricated in parallel on any size of porous sheets for cut and use point of care applications. The simplicity and versatility of the fabrication process demonstrated leads to its widespread adoption both in resource-limited and developed settings.

Example 2: An Indirect ELISA on a Modified 96 Well Paper Device for SARS-CoV-2 Diagnosis Described below is the development of a portable, three-dimensional (3D) microfluidic paper-based analytical device (3D-µPAD) for performing enzyme-linked immunosorbent assays (ELISA) to detect severe acute respiratory symptom coronavirus 2 (SARS-CoV-2) antibodies in a sample. For testing, the device requires only the addition of a small fluid volumes, 10 µL per test well. In this embodiment, the 96 circular-well format paper device was prepared with lamination for easy sample handling and coated with a recombinant human coronavirus SARS-CoV-2 Spike Glycoprotein. A colorimetric detection method was employed, using Alkaline phosphatase (AP) conjugated detecting antibody in the presence of the NBT/BCIP substrate. The colorimetric assays were evaluated using a microplate reader and quantified for linearity, limit of detection (LOD), sensitivity, repeatability and specificity. Found was that the LOD of the assay was 0.01 ng/mL and the $R^2$ value was 0.943 between experiments. The proof-of-concept assay has the potential to develop for clinical screening of the SARS-CoV-2 antibodies as a high throughput immunodetection tool to confirm the SARS-CoV-2 infections in a population who miss the active infection testing window.

The causative agent for the SARS-CoV-2 virus mutated to several variants causing different types of diseases all over the world ranging from mild to severe. The diagnosis of SARS-CoV-2 infection requires a timely and accurate testing method. Currently, the gold standard for the diagnosis of COVID-19 infection is reverse transcription polymerase chain reaction (RT-PCR) to detect the viral particles in nasopharyngeal swabs. RT-PCR is one of the most accurate and sensitive methods and is recommended by the World Health Organization (WHO) to detect the SARS-CoV-2 virus. But this test may require an active state of viral infection for diagnosis. If a patient was infected and misses the active testing window, which falls mostly within 1-10 days of infection, there may be a need to recourse the diagnosis to antibody testing.

Among different types of antibody testing methods, the enzyme-linked immunosorbent assay (ELISA) is an indispensable analytical tool that is routinely used in the laboratories for the detection and quantification of pathogen proteins in complex biological samples. ELISA is a multi-step diagnostic procedure, where each component should be individually tested for the standardization of the assay. Therefore, optimization of each reaction step may be critical in devising a successful ELISA test. The primary component of an ELISA is the solid matrix required for the adhesion of the reagents. It is very important to choose a suitable surface for coating the antigens for ELISA experiments. Most ELISA tests consist of applying a protein solution in PBS buffer or carbonate buffer into microtiter plate wells. Normally, these microtiter plates are 96 well plates with polypropylene or charged polystyrene or surface possessing high affinity to molecules with polar or hydrophilic groups (Welch N G, Lebot C J, Easton C D, Scoble J A, Pigram P J, Muir B W. Polypropylene microtitre plates modified with $[Cr(OH)_6]^{3-}$ for enhanced ELISA sensitivity. J Immunol Methods. 2017 July; 446:70-73. doi: 10.1016/j.jim.2017.03.015. Epub 2017 Mar 30. PMID: 28365327; Boudet F, Thèze J, Zouali M. UV-treated polystyrene microtitre plates for use in an ELISA to measure antibodies against synthetic peptides. J Immunol Methods. 1991 Aug. 28; 142(1):73-82. doi: 10.1016/0022-1759(91)90294-p. PMID: 1717595). These surfaces have high binding capacity for proteins and antibodies and ensures proper antibody orientation. For ELISA using non-protein antigens such as lipid antigens dissolved in organic solvents like ethanol, a hydrophobic surface may be needed (Ketelsen A, Eriksson H. Sensitive detection of hydrophobic antigens using a novel lipid-aggregate based ELISA. J Immunol Methods. 2008 Dec. 31; 339(2):195-204. doi: 10.1016/j.jim.2008.09.012. Epub 2008 Oct. 12. PMID: 18854191). The microwell plates give enough space to allow to cover the bottom of the well with the antigen solution. If the whole surface of the well is not covered uniformly with the fluids, the ELISA reading will be diminished. Also, if excess antibody or antigen is present, layers of antibody or antigen may form and again leads to lower signal. So uniform layering of reagents is a prerequisite for a reliable ELISA reaction. If the quantity of the reagents is reduced in micro quatities, it would be an added advantage to make the assay economical. Also, a massive scale pandemic such as COVID-19 affecting millions of people at the same time, requires a relatively rapid, robust, sensitive, and easy to interpret assay at the point-of-care units.

Figure 13:
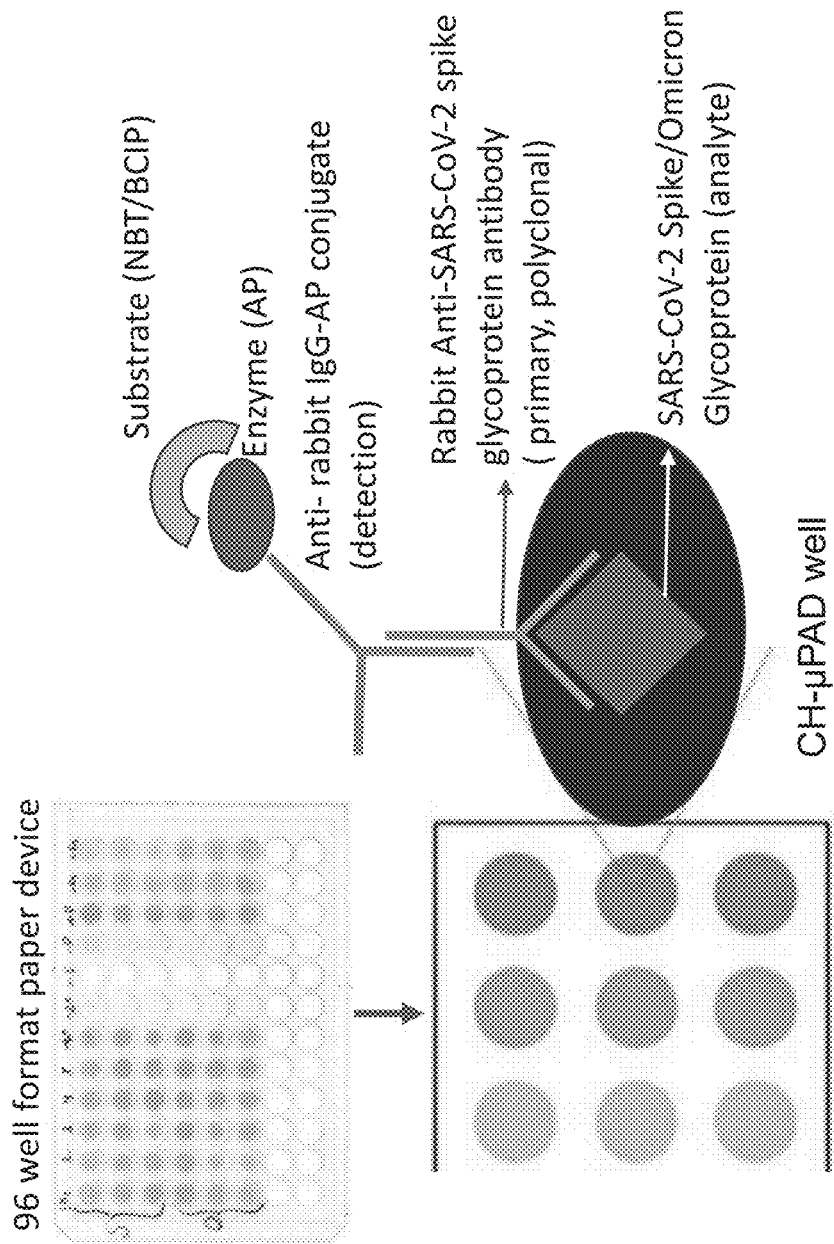
FIG. 13 illustrates a schematic diagram of the assembly of the paper-device based ELISA for SARS-CoV-2 antibody detection assay. The paper device was designed and prepared in 96 well format. The wells of the device were coated with the recombinant SARS-CoV-2 antigen to capture the SARS-CoV-2 antibody in the sample. The antigen-primary antibody would be detected using a secondary antibody conjugated with AP enzyme. Subsequently, the NBT/BCIP substrate was added to facilitate a colorimetric reaction. The color development will be proportional to the antibody concentration in the testing sample.

The surface quality of materials chosen to perform an ELISA assay should fulfill all the above-mentioned criteria. Reported herein is a new proof-of-concept indirect ELISA for detecting the SARS-CoV-2 antibodies in a biological sample using a novel paper-based ELISA platform. Used is a 96 well formatted microfluidic paper-based analytical device (microPADs) for coating SARS-CoV-2 antigen and corresponding antibodies as shown in FIG. 13. The colorimetric reactions were carried out using specific substrates for the enzyme conjugates. The color generated was analyzed using a microplate reader and the data were analyzed for linearity, limit of detection (LOD), sensitivity, specificity, and repeatability.

A recombinant SARS-CoV-2 spike glycoprotein (Catalogue number ab273065, Abcam, USA) or Recombinant Human coronavirus SARS-CoV-2 (B.1.1.529/Omicron) Spike Glycoprotein S1 (ab290828, Abcam, USA) and Anti-SARS-CoV-2 spike glycoprotein antibody (ab272504, Abcam, USA), Goat Anti-Rabbit IgG H&L (ab6702, Abcam, USA) were used for standardizing the paper-based COVID-19 ELISA. 1% Bovine Serum Albumin (BSA, A1595, Sigma-Aldrich, USA) was used as the blocking buffer. Phosphate Buffer Saline was used as a solvent (PBS, 1001000, Thermo Fisher Scientific, USA). Tween-20 detergent (Sigma, USA) was used as an additive surfactant for preparing PBST containing 0.05% Tween-20 in PBS for wash. The secondary antibody used in this study is Goat Anti-Rabbit IgG H&L (ab97156, Abcam, USA) that was conjugated with Alkaline Phosphatase. NBT/BCIP Solution—Ready to Use Alkaline Phosphatase chromogen (ab7468, Abcam, USA) was used for developing the colorimetric reaction. For the complex biological sample, Goat serum (4340779, Sigma-Aldrich, USA) was used as a mock serum sample. DMEM media was used as a complex biological sample (11995065, Thermo Fisher Scientific, USA).

The assay principle used in this study is paper-based indirect ELISA. For finding the ideal antigen coating concentration, the recombinant SARS-CoV-2 spike glycoprotein antigen samples were serially diluted in PBS from 0.001 ng/µL to 1000 ng/µL and 10 µL of each diluted samples were added onto the paper wells and incubated at 4° C. for overnight. 10 µL of 1 ng/µL of the coating antigen were chosen for further optimizing the Anti-SARS-CoV-2 spike glycoprotein primary antibody concentrations. Serial dilutions ranging from 0.001 ng/µL to 100 ng/µL of the Anti-SARS-CoV-2 spike glycoprotein primary antibody was added onto the antigen coated wells and incubated at room temperature for 2 hours. 10 µL of 1 ng/µL of Alkaline Phosphatase (AP) conjugated Goat Anti-Rabbit IgG H&L was used as secondary antibody and incubated at room temperature for 1 hour. The AP conjugated reagent was freshly prepared for each experiment to preserve the enzyme activity. The wells were washed with 10 µL 1×PBST and ×PBS between each step. The blank sample with 1×PBS and NBT/BCIP substrate solution was used for the background signal. Goat Anti-Rabbit IgG H&L without AP conjugate was used as a negative sample to assess the specificity of the enzymatic reaction.

Specificity of the ELISA means the reaction should differentiate the target antibody from the other matrix components. Goat serum spiked with and without Anti-SARS-CoV-2 spike glycoprotein primary antibody was used as a mock serum to test the specificity, For showing the specificity of reagents, the assays were carried out without AP in the detecting step (negative control), without the recombinant SARS-CoV-2 antigen (no-target control), the sample without the SARS-CoV-2 primary antibody and the sample with the SARS-CoV-2 primary antibody (positive control) (10 ng/µL). The data were analyzed statistically.

To obtain the colorimetric readout, 10 µL of NBT/BCIP substrate was added onto the wells of the paper device and incubated in dark. The fluid in the wells were removed and the absorbance of the colorimetric reactions were measured at 405 nm using a microplate reader after 60 minutes of the enzymatic reaction. The reaction kinetics were checked after 20 minutes also. To see the color development using naked eye and record, the device was scanned using a regular paper scanner, such as a Ricoh scanner. Limit of detection (LOD), sensitivity, repeatability and specificity of the assay were determined. A minimum of 3 experiments in triplicates were used to analyze the results statistically.

The current research work explores COVID-19 detection in the ELISA format using paper based 96 well plates fabricated using lamination sheets and filter paper sheets. The hydrophobic barriers around the wells in the well plate are formed by ethylene vinyl acetate (EVA), the hot melt adhesive, coated inside of the lamination sheets. The lamination sheets are made of two layers, inner side made of EVA and polyethylene terephthalate (PET) on the outer side. During the process of lamination, the EVA melts when it passes through the hot rollers in the laminator and fastens tightly to the paper sheets when it comes to room temperature. The current fabrication process overcomes many limitations of the commonly used techniques such as wax patterning, lithography and inkjet printing. It is a simple two-step process, cutting of circular holes in the lamination sheets in the form of a 96 well plate and heating them with a paper sheet in between them on a laboratory use hot plate, thus named as "cut and heat microPADs well plate" (CH-microPADs well plate). The fabricated well plates as described here are highly robust and possess very high mechanical strength against folding, bending, tearing and twisting, making them virtually unbreakable. The fabrication process involves minimal human intervention, making it ideally suitable for mass fabrication of microPADs well plates.

Figures 14A, 14B:
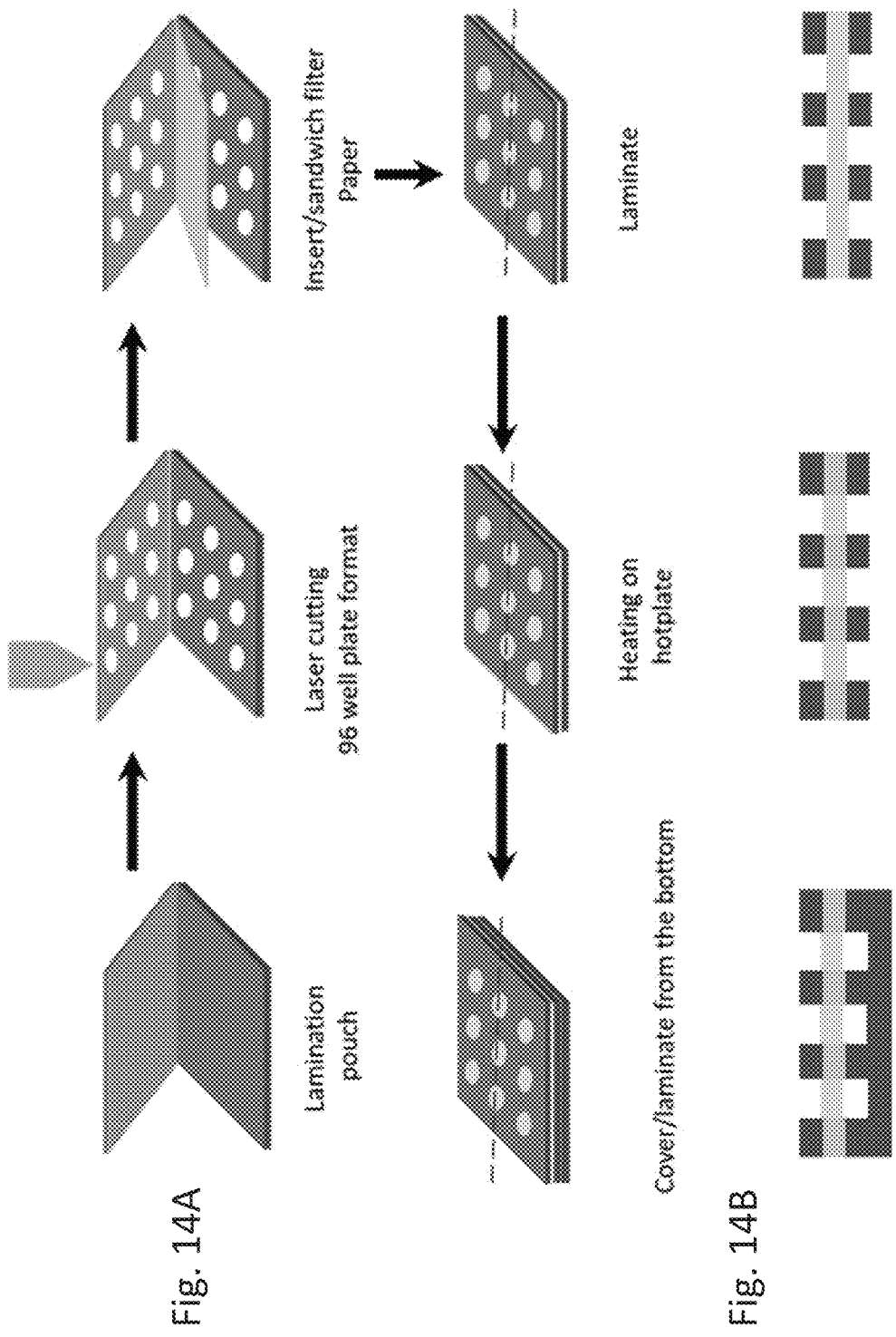
FIG. 14A and FIG. 14B shows the schematic illustration of CH-microPADs.

The paper 96 well plates were then cut using a multipurpose commercial laser cutter, such as the Epilog Laser Fusion 120 watts. The laser cutter is used primarily for cutting and engraving of plastic and wood laminates. Stationery purpose lamination sheets were used to create the hydrophilic circular patterns selectively as wells and hydrophobic barriers in the areas except the wells on filter paper sheets. A6, A5 and A4 size lamination pouches were used to cut the devices. Different size lamination pouches were sourced from Amazon. The lamination pouches can be of any brand available from online or local stationary stores. The thickness of lamination pouch used (brand name, Modest, 2 layers) was 250 μm. The filter paper sheet of interest was then placed in between cut lamination sheets, FIG. 14A, making a sandwich structure. The sandwich structures were then heated on a laboratory hot plate (IKA C-MAG HS 7) at 160 degrees of temperature for a duration of 30 minutes. The resulting devices were then laminated from the backside using another lamination single sheet to have covered wells same as in the conventional well plates as shown in FIG. 14B.

Optical and SEM Imaging of Filter Paper and Fabricated CH-microPADs Well Plate

Figures 15A, 15B, 15C, 15D, 15E, 15F, 15G, 15H, 15I:
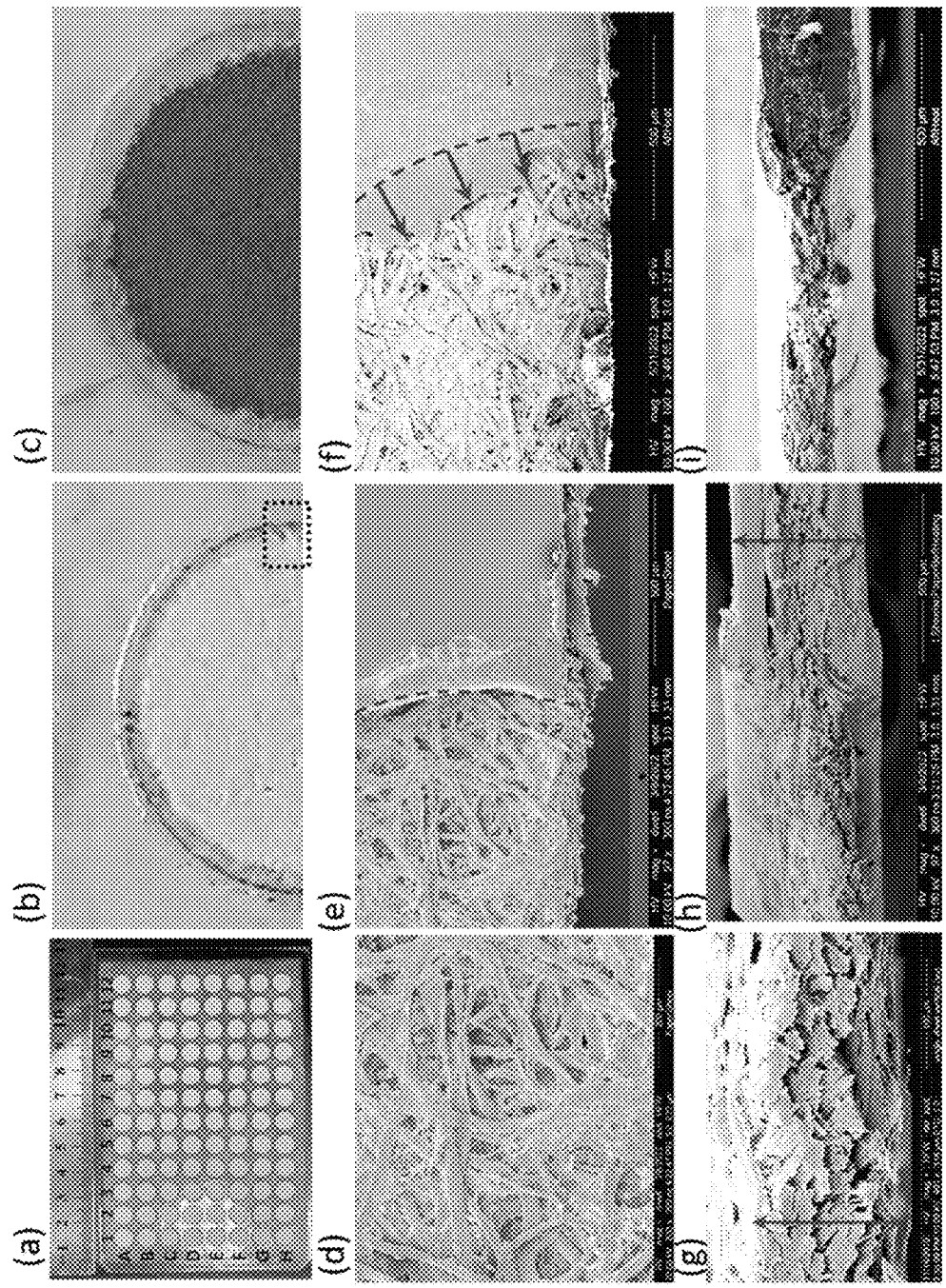
FIG. 15A through FIG. 15I shows the optical and SEM images of the circular wells from top and cross-section of the CH-microPADs well plate.

The 96 well plates were characterized using optical and scanning electron microscope (SEM) imaging. The picture of a 96 well plate fabricated is shown in FIG. 15A with a ruler. The half portion of the well is shown without and with Rhodamine B, (FIG. 15B and FIG. 15C). Surface and cross-sectional topography of filter paper sheet and fabricated devices is shown using SEM before and after heating the devices in FIG. 15A-FIG. 15I. For the device fabrication, filter paper sheets were used. SEM image of the top and cross-sectional view of the paper sheet and well is shown in FIG. 15D-FIG. 15F and FIG. 15G-FIG. 15I respectively. The paper sheet is made of multiple layers of cellulose fibers and the thickness of the paper sheet is approximately 160 micrometers (μm) (FIG. 15G). The paper sheet was placed between two lamination sheets having circular holes in the shape of a 96 well plate and heated the sandwich assembly for 20 seconds at 160° C. The short 20 s heating was to hold it properly for imaging purpose only so that the paper sheet made good contact with the lamination sheets and did not move while handling the device. The well top view and cross-section after 20 s heating is shown in FIG. 15E and FIG. 15H. The device was then heated at 160° Celsius for 35 minutes. With heating, the EVA diffused in the paper sheet in the vertical direction and also in the hole area laterally (FIG. 15F and FIG. 15I). On heating, the sandwiched area became hydrophobic because of the diffusion of melted EVA in the paper sheet and open paper areas remained hydrophilic for the flow of analytes.

The typical detection range for an ELISA is 0 0.01 ng to 0.1 ng of the analyte. The sensitivity of ELISA is largely dependent upon the particular characteristics of the antibody-antigen interaction (Zhang S, Garcia-D'Angeli A, Brennan J P, Huo Q. Predicting detection limits of enzyme-linked immunosorbent assay (ELISA) and bioanalytical techniques in general. Analyst. 2014 Jan. 21; 139(2):439-45. doi: 10.1039/c3an01835k. PMID: 24308031). In experiments, for detecting the sensitivity, serial dilutions of Anti-SARS-CoV-2 spike glycoprotein primary antibody was prepared and the lowest concentration of Anti-SARS-CoV-2 spike glycoprotein primary antibody detected in the colorimetric reaction, comparing to the negative control and the higher dilutions was determined as the sensitivity of the assay and plotted in the graph in FIG. 16A. The ELISA was sensitive to detect up to 0.01 ng/μL of the Anti-SARS-CoV-2 spike glycoprotein primary antibody in a sample. The sensitivity of the ELISA can be increased by using polyclonal antibodies instead of monoclonal antibodies, due to higher levels of polyclonal antibody binding to the target antigen. Considering this, SARS-CoV-2 spike glycoprotein rabbit polyclonal primary antibody was chosen for developing the assay. Along with the increased sensitivity, this will help to reduce the cost of the assay.

Figures 16A, 16B, 16C, 16D:
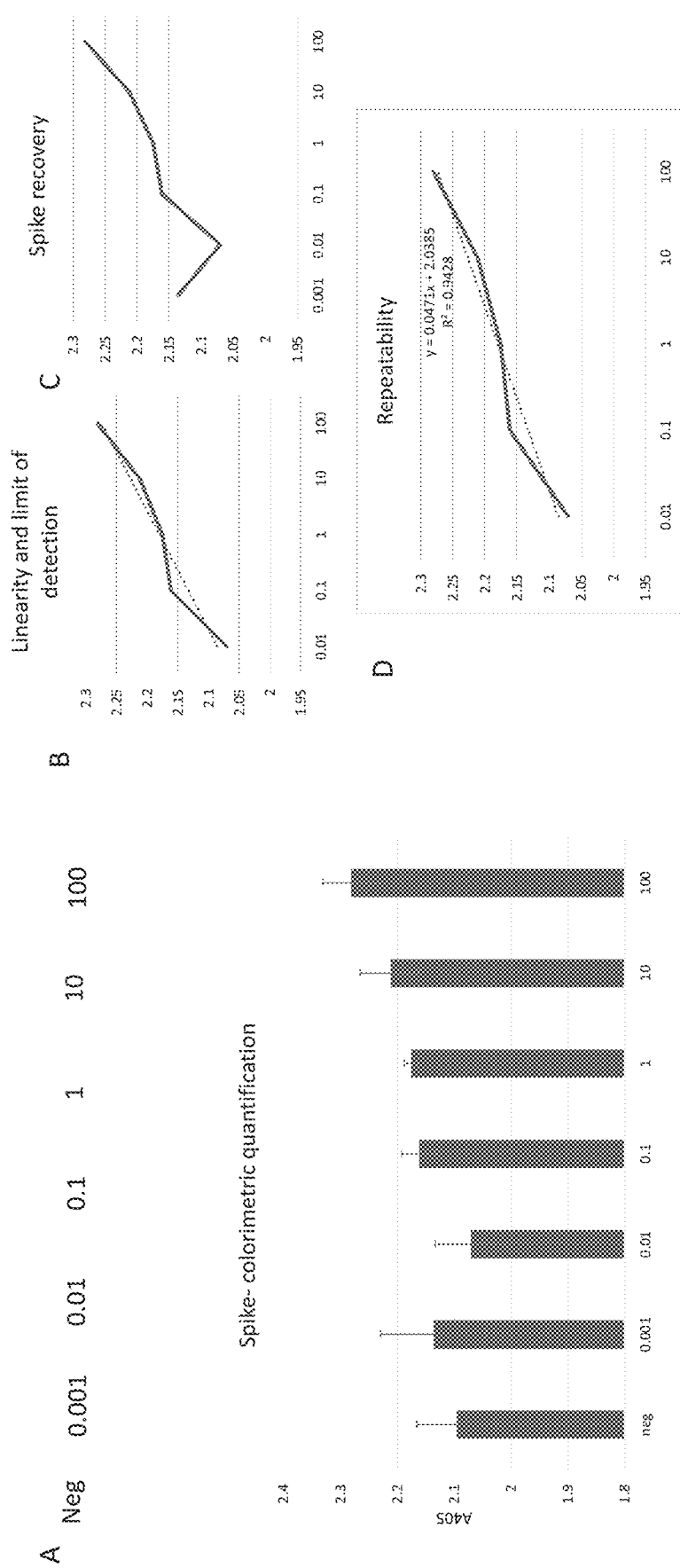
FIG. 16A through FIG. 16D shows the sensitivity of the assay. Images of the colorimetric assay of SARS-CoV-2 h antibody detection from known concentrations of 0.001 to 100 ng/μL after 1 hour of color development.

Furthermore, LOD of the assay was calculated from the linear curve generated in the colorimetric reaction, where the lowest concentration of SARS-CoV-2 spike glycoprotein primary antibody could be quantified reliably at least in 3 independent experiments in triplicates. This is the mean value of the smallest result measured in the linear part of the curve. The assay shows an LOD of 0.01 ng/μL as shown in FIG. 16B. An increase was noticed in colorimetric signal from higher concentrations and also in very low concentrations of the SARS-CoV-2 primary antibody. The consistent linear part of the reaction curve was considered to calculate the LOD. The increase in color signal beyond the linear part of the graph indicates the non-specific color development. Linearity of dilution experiments provide information about the precision of the assay. For quantitation of antibody in a biological sample, it is necessary to create a standard curve of the testing antibody in serial dilutions. Used herein was PBS as diluent for diluting all reagents and it gave a reliable linear curve for analyzing the linearity and spike recovery of the ELISA. Five linear dilutions ranging from 0.01 ng/μL to 100 ng/μL of SARS-CoV-2 primary antibody showed linearity and spike recovery was observed at 0.001 ng/μL as shown in FIG. 16B. Spike recovery is calculated to determine whether the SARS-CoV-2 primary antibody detection is influenced by diluent used or the surface of the paper wells. In these experiments, the spike recovery was consistent at 0.001 ng/μL SARS-CoV-2 primary antibody, indicating the accuracy of detection, as shown in FIG. 16C. Further, the repeatability of the assay is validated between experiments. Repeatability is a precision parameter to validate the reproducibility of the assay. Precision describes the deviation from the mean value. The assay showed a good repeatability with an $R^2$ value 0.9428 between 3 independent experiments, as shown in FIG. 16D.

Figures 17A, 17B, 17C:
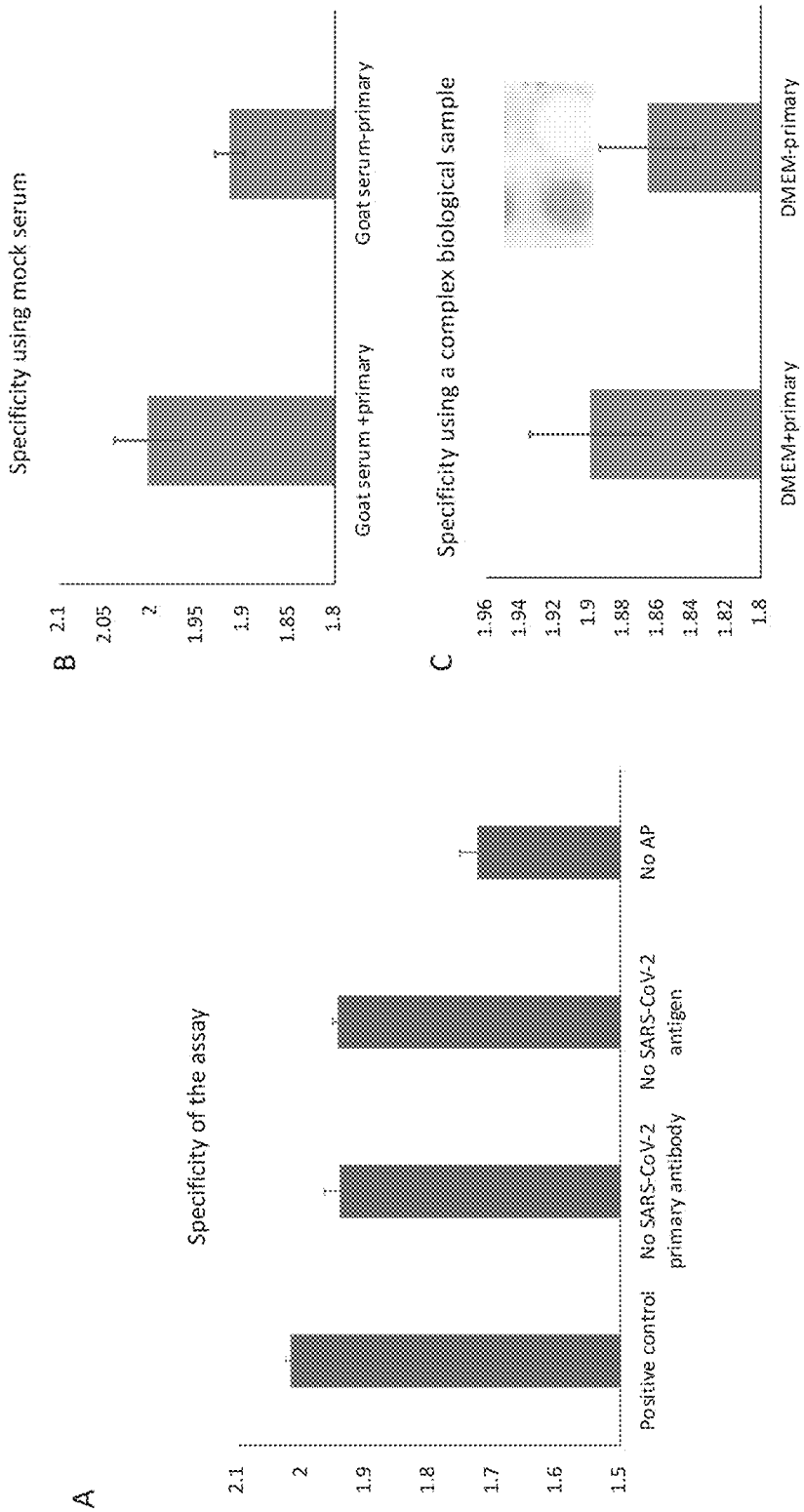
FIG. 17A through FIG. 17C includes images of the colorimetric assay obtained for the paper ELISA with positive control, without the SARS-CoV-2 antibody, without the recombinant SARS-CoV-2 antigen (no- target control), without AP in the sample with the SARS-CoV-2 primary antibody (positive control) (10 ng/μL). The bar diagrams show the color development observed after 1 hour from various conditions.

Specificity of ELISA means the reaction should differentiate the target antibody from the other matrix components. Used herein is a goat serum spiked with and without Anti-SARS-CoV-2 spike glycoprotein primary antibody as a mock serum to test the specificity. Images of the colorimetric assay obtained for the well without AP in the detecting step (negative control), the well without the recombinant SARS-CoV-2 antigen (no-target control), the sample without the SARS-CoV-2 primary antibody and the sample with the SARS-CoV-2 primary antibody (positive control) (10 ng/μL). The graphs in FIG. 17A-FIG. 17C shows the absorbance at 405 nm observed after 1 hour of the reaction in various conditions. The assay showed highly specific color development based on the Anti-SARS-CoV-2 spike glycoprotein primary antibody concentration.

Developed herein is a proof-of-concept inexpensive colorimetric paper-based assay to detect SARS CoV2 antibodies in biological samples. The colorimetric readout facilitates naked eye observation and quantification of data using a regular microplate reader. With this proof-of-concept assay, the obtained experimental data suggest that this assay can detect the SARS-CoV-2 antibody at 0.01 ng/μL with an $R^2$ value of 0.94. The assay can be performed within in 4 hours with a minimum laboratory equipment such as microplate reader as the 96 well format offer a robust throughput in mass screening. Also, the assay can be interpreted with naked eye in comparison to the negative and positive controls. This assay can detect the SARS-CoV-2 antibody in different types of biological samples, demonstrating its potential to be an alternative way to perform serological testing in testing centers. The antigen coated devices require less storage space and can be stored in normal refrigerator until the assay is conducted. The cost of assembling the assay is lower compared to the regular ELISA as this assay requires only micro volumes. This assay has the potential to be developed into a point-of-care diagnostic device and can achieve sensitivity, specificity, and reproducibility comparable to other colorimetric serological assays. This ELISA devices could also contribute to the evaluation of vaccination efficacy in a large number of human trial samples due to its rapid, inexpensive and user-friendly platform.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of manufacturing a microfluidic analytical device comprising:
    providing a top lamination layer and a bottom lamination layer, wherein each of the top lamination layer and the bottom lamination layer comprises an outer layer and an inner layer;
    cutting out one or more channel spaces from the at least one of the top lamination layer and the bottom lamination layer;
    positioning at least one porous middle layer between the top lamination layer and the bottom lamination layer, such that each of the two inner layers face the at least one porous middle layer;
    wherein the at least one porous middle layer contacts an entire surface of the inner layers of the top lamination layer and the bottom lamination layer;
    subjecting the top lamination layer and the bottom lamination layer to a process;
    wherein the process creates one or more hydrophilic channels in the at least one porous middle layer within the channel spaces;
    wherein the process impregnates the at least one porous middle layer with a portion of the inner layers in the region around the channel spaces, thereby creating hydrophobic barriers surrounding each of the one or more hydrophilic channels.

2. The method of claim 1, wherein the process comprises heating the top lamination layer and the bottom lamination layer to a temperature sufficient to melt both the inner layers.

3. The method of claim 2, wherein the heating temperature is ranging between 100-200° C.

4. The method of claim 2, wherein the heating duration is ranging between 5 minutes to 12 hours.

5. The method of claim 1, wherein the outer layer comprises a material selected from the group consisting of: glass, polymer, ceramic, metalloid, organic material, and combinations thereof.

6. The method of claim 5, wherein the outer layer comprises polyethylene terephthalate (PET).

7. The method of claim 1, wherein the inner layers of the top lamination layer and the bottom lamination layer comprise a material having a melting point ranging between 60-150° C.

8. The method of claim 7, wherein the inner layers of the top lamination layer and the bottom lamination layer comprise ethylene vinyl acetate (EVA).

9. The method of claim 1, wherein the process comprises applying sufficient pressure to the top lamination layer and the bottom lamination layer to allow both the inner layers to permeate at least partially through the at least one porous middle layer.

10. The method of claim 1, wherein after the process, the inner layer of the top lamination layer and the bottom lamination layer permeates the entire thickness of the at least one porous middle layer.

11. The method of claim 1, further comprising a step of:
    placing a cover layer on top of the top lamination layer and on the bottom of the bottom lamination layer, wherein the cover layer is configured to at least partially cover the one or more hydrophilic channels.

12. The method of claim 1, wherein the at least one porous middle layer is made from a material selected from the group consisting of: a cloth, a cellulosic paper, non-cellulosic paper, natural fiber sheet, synthetic sheet and combinations thereof.

13. The method of claim 1, wherein the at least one porous middle layer has a pore size ranging between a 1 nanometer to 1000 microns.

14. The method of claim 1, wherein the one or more hydrophilic channels are lateral wicking flow channels.

* * * * *